(12) United States Patent
Lu

(10) Patent No.: US 9,977,158 B2
(45) Date of Patent: May 22, 2018

(54) HYBRID OPTICAL DEVICES, AND APPLICATIONS USING SAME INCLUDING OPTICAL CLOAKING SYSTEM

(71) Applicant: Weimin Lu, Novi, MI (US)

(72) Inventor: Weimin Lu, Novi, MI (US)

( * ) Notice: Subject to any disclaimer, the term of this patent is extended or adjusted under 35 U.S.C. 154(b) by 168 days.

(21) Appl. No.: 14/703,992

(22) Filed: May 5, 2015

(65) Prior Publication Data
US 2015/0234100 A1    Aug. 20, 2015

Related U.S. Application Data

(63) Continuation-in-part of application No. 13/714,770, filed on Dec. 14, 2012, now Pat. No. 9,405,118.

(60) Provisional application No. 62/089,356, filed on Dec. 9, 2014, provisional application No. 61/988,454, filed on May 5, 2014, provisional application No. 61/646,570, filed on May 14, 2012.

(51) Int. Cl.
| | |
|---|---|
| *G02B 5/09* | (2006.01) |
| *G02B 17/08* | (2006.01) |
| *G02B 27/09* | (2006.01) |
| *G02B 17/00* | (2006.01) |
| *G02B 17/02* | (2006.01) |

(52) U.S. Cl.
CPC ............ *G02B 5/09* (2013.01); *G02B 17/008* (2013.01); *G02B 17/02* (2013.01); *G02B 17/086* (2013.01); *G02B 27/0938* (2013.01); *G02B 17/08* (2013.01)

(58) Field of Classification Search
None
See application file for complete search history.

(56) References Cited

U.S. PATENT DOCUMENTS

| | | | | |
|---|---|---|---|---|
| 5,002,379 | A * | 3/1991 | Murtha | F24J 2/062 126/600 |
| 7,206,131 | B2 | 4/2007 | Alden | |
| 8,094,378 | B2 | 1/2012 | Kildishev et al. | |
| 2003/0047666 | A1 * | 3/2003 | Alden | F41H 3/00 250/208.1 |
| 2010/0116319 | A1 * | 5/2010 | Martinez Anton | F24J 2/06 136/246 |
| 2015/0311857 | A1 * | 10/2015 | Didomenico | F24J 2/06 136/246 |

* cited by examiner

*Primary Examiner* — Derek S Chapel
(74) *Attorney, Agent, or Firm* — Carrier Blackman & Associates, P.C.; Joseph P. Carrier; William D. Blackman

(57) ABSTRACT

A hybrid optical device for compressing light, including a first part which receives incident light shining on the device, wherein the first part is formed into sections along at least one direction thereof, wherein the sections receive respective portions of the light received by the first part, and individually compress and redirect the received portions of light, a second part which includes plural reflective surfaces which receive the compressed light from the sections of the first portion and further compress and redirect the portions of light, and a third part which receives the further compressed portions of light from the sections of the second part, and redirects same such that the light is output from the device.

20 Claims, 18 Drawing Sheets

HYBRID OPTICAL DEVICES, AND APPLICATIONS USING SAME INCLUDING OPTICAL CLOAKING SYSTEM

CROSS REFERENCE TO RELATED APPLICATIONS

The present application is a continuation-in-part (CIP) of co-pending application Ser. No. 13/714,770 filed 14 Dec. 2012, which claims priority from U.S. Provisional Patent Application 61/646,570 filed 14 May 2012. The present application also claims priority from U.S. Provisional Patent Application 61/988,454 filed 5 May 2014 and U.S. Provisional Patent Application 62/089,356 filed 9 Dec. 2014. The entire disclosures of all of these prior applications are incorporated herein by reference.

BACKGROUND OF THE INVENTION

Field of the Invention

The present invention relates to hybrid optical devices which significantly concentrate and change direction of light rays, and to various applications for such hybrid optical devices, including optical cloaking systems. More particularly, the present invention pertains to such hybrid optical devices which may be manufactured using commonly available materials, and which may have a very large aperture for receiving light therein and a very short focal lengths by structurally dividing the aperture into sections or arrays. The sections or array components individually compress and redirect portions the light entering the aperture so that the focal length of the overall device desirably becomes very short, and so that the hybrid optical devices may be formed in very small/compact sizes in comparison to conventional optical devices. The optical can be economically manufactured in a wide variety of shapes and sizes for use in a wide variety of applications, including optical cloaking systems, scenery projection, ultra compact telescopic systems, ultra compact magnification systems, ultra compact solar concentrators, etc.

Description of the Background Art

In applicant's prior application U.S. Ser. No. 13/714,770, applicant has disclosed several novel embodiments of hybrid optical devices in the form of an optical cloaking system which can optically cloak/hide objects in the visible light spectrum such that the objects appear invisible, and which can be efficiently and practically manufactured using common optical materials in the form of prisms, lenses, mirrors, and the like. Such optical cloaking system bends and/or compresses light such that, within the system, the light passes around a cloaked space in which an object is disposed, and a person viewing a larger space including the cloaked space will not see the object, but will see a background behind the object in full view substantially undistorted in relation to the rest of the larger space.

Such optical cloaking system as disclosed in U.S. Ser. No. 13/714,770 is a significant improvement over previously known optical cloaking systems/devices which are also discussed in U.S. Ser. No. 13/714,770. However, applicant's previous optical cloaking system remains to be improved, especially in terms of the size and structure of the hybrid optical devices used therein. For example, applicant's previously disclosed hybrid optical devices have a relatively large longitudinal (depth) dimension, e.g., it is typically longer than the height dimension and increases as the height dimension of the devices increase. This creates practical limits for use of the previously disclosed optical devices because for some applications they become so large that they are difficult to manufacture, transport, and handle. Moreover, such optical cloaking system is but one useful application of the hybrid optical devices according to the present invention.

Thus, while there are known hybrid optical devices which maybe usefully applied as optical cloaking systems and the like as disclosed in U.S. Ser. No. 13/714,770, these remain to be improved on in terms of size, ease of manufacture and handling, etc., as well as in terms of other useful applications for same in addition to optical cloaking.

SUMMARY OF THE INVENTION

It is an aspect and object of the present invention to provide improved hybrid optical devices which satisfy the discussed need.

According to a first aspect of the present invention there is provided a hybrid optical device comprising: a first portion which receives incoming light and includes plural sections, wherein each of the sections compresses and redirects some of the incoming light at a (first) predetermined angle; a second portion which includes plural sections which receive the compressed, redirected light from the sections of the first portion, and further compress and redirect the light at another (a second) predetermined angle; and a third portion which receives the further compressed and redirected light from the sections of the second portion, and redirects same at a third predetermined angle such that the light is output from the hybrid optical device.

Such hybrid optical device according to the first aspect is very advantageous and desirable over conventionally know optical devices for several reasons. For example, when the first portion corresponds to an aperture of the hybrid optical device, the sections of the first portion individually compress portions of the light entering the aperture, and then the sections of the second portion further compress the portions of the light so that the focal length of the overall device desirably becomes very short. This permits the incoming light to be significantly compressed or concentrated, and output in a predetermined direction, so that the hybrid optical devices of the invention have a significantly reduced depth or longitudinal dimension in comparison to conventionally known optical devices, even if the optical devices have an aperture with a relatively large height and/or width dimension though which incoming light enters the optical devices. Further, the optical devices can be constructed of ordinary, readily available materials with positive refractive index such as glass, transparent plastics including acrylic and polycarbonate, and even metals and other materials which can reflect light, while the optical device does not require any moving parts, power supply, or any type of signal reception or processing. Correspondingly, the optical device can be economically manufactured in a relatively compact size, which greatly expands potential uses for same. Also, the common materials used in forming the hybrid optical devices can be precisely manufactured into substantially any size or shape so that little optical distortion is created by the optical device.

According to a second aspect of the present invention, in addition to the first aspect, the third portion may further compress the light received from the sections of the second portion, and output the further compressed light toward a focal point. Such hybrid optical device according to the second aspect is further advantageous because it permits a further miniaturization of the optical device which is very desirable in many applications optical devices have traditionally been used, including magnification systems, telescopic systems, solar power collecting systems, etc.

According to a third aspect of the present invention, in addition to the first aspect, the third portion may output the further compressed light in a direction substantially parallel to a direction of the incoming light which enters the first portion. Such hybrid optical device according to the third aspect is further advantageous because it permits the optical device to be conveniently applied in various applications such as optical cloaking systems, highly compact magnification systems, scenery projection systems, etc.

According to a fourth aspect of the present invention, in addition to the first-third aspects, more than one of the hybrid optical devices may be used together in various applications for achieving specific results, in which the light output by the first optical device is directed into the second optical device. For example, two of the hybrid optical devices may be combined as an optical cloaking system which not only cloaks given object(s) but projects various images to a viewer who is looking in the direction of the first hybrid optical device, such as an unobstructed image of the background behind the cloaked object, an image of pleasant scenery such as a tree, a garden, landscape, seascape, etc. For such purpose the optical devices may be the same or may be different from each other, e.g., for some applications it is preferable to use one larger size hybrid optical device which is closest to the viewer and one reduced size optical device away from the viewer so that it does not become an obstruction.

According to a fifth aspect of the present invention, there is provided a hybrid optical device for compressing light, including an aperture for light to enter the device, wherein the aperture is divided into sections which each receive some of the light entering the aperture, and compress and redirect the received light; and a portion which receives the light that has been compressed and redirected by the sections of the aperture, and outputs the light from a predetermined portion of the device, e.g., a center portion of the device or a peripheral portion of the device. The compressed light may be output from the predetermined portion in any desired direction, e.g., parallel to a direct in which the light enters the aperture, toward a focal point, etc.

Further areas of applicability of the present invention will become apparent from the detailed description provided hereinafter. It should be understood that the detailed description and specific exemplary examples, while indicating the present embodiments of the invention, are intended for purposes of illustration only and are not intended to limit the scope of the invention.

BRIEF DESCRIPTION OF THE DRAWINGS

FIGS. 6A-6C depict a hybrid optical device according to a sixth illustrative embodiment of the present invention, in which FIG. 6A is a front elevational view thereof, FIG. 6B a side cross-sectional view thereof, and FIG. 6C is a rear elevational view thereof. This embodiment is similar to the first embodiment of FIGS. 1-2 except that the front aperture is divided into sections in an array along two directions (height and width), whereas in the first embodiment the sections are divided into sections in an array along only one direction, and similarly the rear portion has reflecting surfaces arranged in an array extending in two directions, whereas the rear portion of the first embodiment has reflecting surfaces arranged in an array extending in one direction.

FIGS. 7A-7C depict a hybrid optical device according to a seventh illustrative embodiment of the present invention, in which FIG. 7A is a front elevational view thereof, FIG. 7B a side cross-sectional view thereof, and FIG. 7C is a rear elevational view thereof. This embodiment is similar to the fifth embodiment of FIG. 5 in essentially the same manner as the sixth embodiment is similar to the first embodiment.

DETAILED DESCRIPTION OF THE PRESENT ILLUSTRATIVE EMBODIMENTS

A number of selected illustrative embodiments of the invention will now be described in some detail, with reference to the drawings. It should be understood that only structures considered necessary for clarifying the present invention are described herein. Other conventional structures, and those of ancillary and auxiliary components of the system, are known and understood by those skilled in the art. These illustrative embodiments are hybrid optical devices and various applications of such devices.

Generally, a primary feature or aspect of all of the embodiments and applications of the hybrid optical devices according to the present invention is that they have very short focal lengths which is achieved by structurally dividing an aperture through which incident light enters the device into sections which then individually compress and redirect portions the light entering the aperture in an organized, non-overlapping manner. The individually compressed and redirected portions of light may then be collected into one or a small number of concentrated outputs. Because the hybrid optical devices have very short focal lengths, they may be formed in very small/compact sizes in comparison to conventional optical devices having a same size aperture for incoming light. In each of the embodiments of the present invention as disclosed herein the portions of light which have entered the aperture and been individually compressed and redirected are then further compressed and redirected individually in an organized, nonoverlapping manner, and a third time redirected, possibly further compressed and then outputted from the device in an organized, non-overlapping manner. Because of the organized, non-overlapping manner in which the hybrid optical devices according to the invention compresses and redirects the individual light portions, the compressed and redirected portions of light output by the device correspond to the light rays of the incident light which enter the aperture of the device, although they are compressed in size. Correspondingly, the output light portions may be converted back into light rays which are substantially the same as those of the incident light, e.g., by passing in opposite direction through another structurally equivalent hybrid optical device such as in the arrangement shown in FIG. 8. In other words, the hybrid optical device according to the invention compresses and redirects incident light in a reversible manner.

The following detailed description, presents three exemplary embodiments of designs for the hybrid optical devices according to the present invention, as well as some exemplary constructions and applications for the hybrid optical devices according to the present invention.

Figure 1:
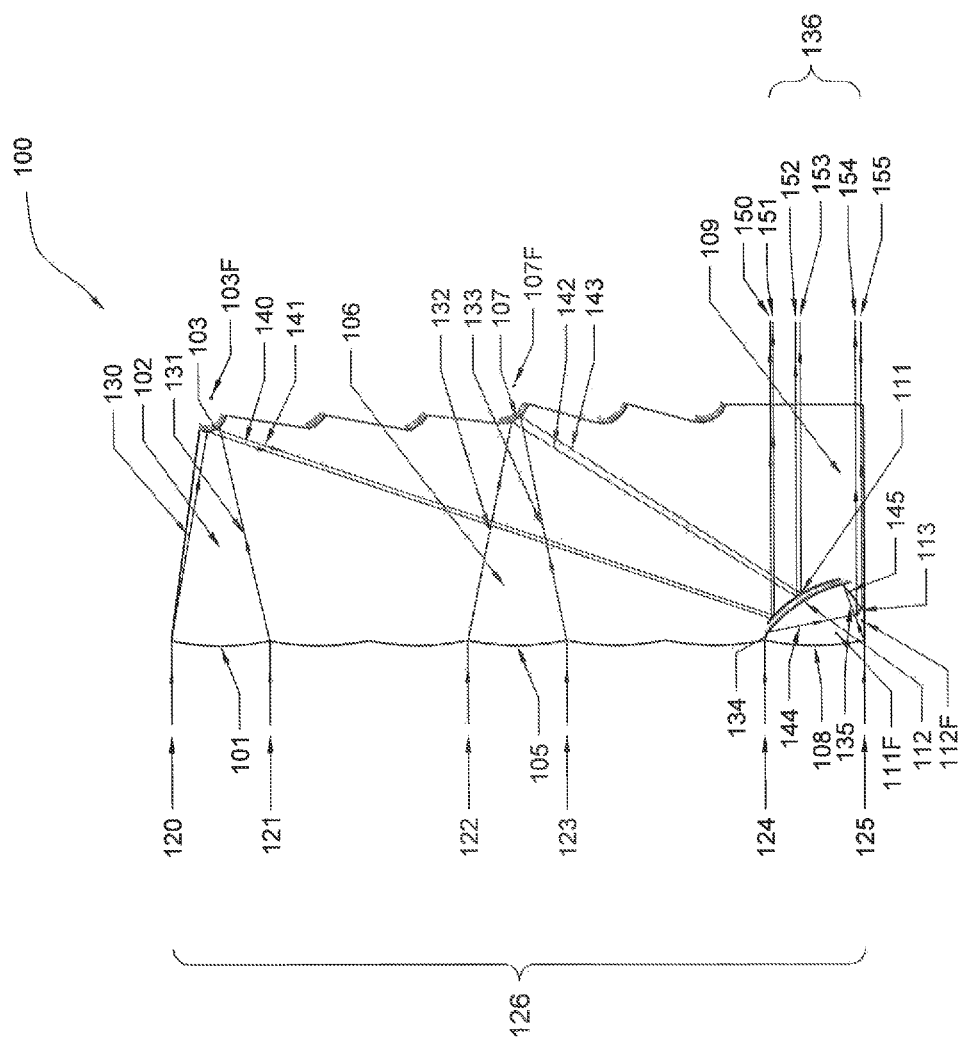
FIG. 1 is a side cross-sectional view of a hybrid optical device according to a first illustrative embodiment of the present invention, wherein the device is formed as a single unitary member and outputs light in a direction substantially parallel to a direction in which light enters an aperture of the device.

Referring now to the FIG. 1, there is shown a hybrid optical device according to a first illustrative embodiment of the present invention, generally denoted by reference numeral 100, wherein FIG. 1 is a side cross-sectional view of the device. The hybrid optical device 100 is a lens in a form of a single, unitary, solid member made of transparent optical material with positive refractive index, such as acrylic resin, polycarbonate resin, glass, or the like, and wherein certain surfaces thereof are coated with appropriate material(s) such as a metal, white pigment, etc., so that they will reflect light. As depicted the device receives light via an aperture surface thereof at the left side of the device in FIG. 1, and outputs compressed light at a lower portion thereof at a surface opposite to the aperture surface on the right side of the device in FIG. 1. The compressed, output light 150-155 extends in a direction substantially parallel to the direction of the light 120-125 entering the aperture surface. As also depicted, the light that is compressed and redirected within the device 100 is only reflected off specific surfaces of the device which have reflective material provided thereon, whereas no internal reflection is otherwise created by the transparent optical material with positive refractive index used in forming the device.

As shown, an aperture of the device and through which light enters the device is broken up into sections which form an array of convex (like spherical) surfaces 101, 105, 108, and some between them, so that each of these sections compresses and redirects a portion of the light entering the aperture, and collectively all of the sections compress and redirect all of the incoming light entering the left side of the device 100. Thus, for example, when typical horizontal incident light rays 120, 121,122, 123,124,125, which collectively have a total beam width 126 that covers the entire surface of the aperture of the hybrid optical device 100, shine on the hybrid lens 100, the incident light rays are compressed and redirected by the different sections into which they enter the lens. This is a primary aspect of the present invention.

In top section 102, incident light rays 120, 121 with a beam width between 120 and 121 are converged by the convex surface 101 in the top section of the lens to become light rays 130, 131 directed towards a focal point 103F, which is also the focal point of a convex reflection (like hyperbolic surface) mirror 103 formed at a surface of a rear portion of the device 100 opposite to the aperture. Again, the convex reflection mirror 103 may be formed by forming the rear surface of the device with an appropriate convex or hyperbolic shape, and coating the shaped surface with a light-reflecting material such as a metal, white pigment, etc. The light rays 130, 131 are reflected and converged by the mirror 103 to become light rays 140, 141 directed towards a focal point 111F in section 109 in a lower portion of the device 100 where a collimating mirror 111 is provided which also has a focal point at 111F. The collimating mirror 111 may also be formed by forming a surface of the device with an appropriate convex or parabolic shape, and coating the shaped surface with a light-reflecting material such as a metal, white pigment, etc. The light rays 140, 141 are collimated and reflected by the mirror 111 to become exit light rays 150, 151 with beam width between 150 and 151. Thus the incident light rays 120, 121 with beam width between 120 and 121 have been compressed and bent by the top section 102 to become the exit light rays 150, 151 with beam width between 150 and 151.

The device 100 has a number of middle sections, which number will vary according to the size/height of the device. The depicted device 100 has five middle sections which are essentially the same as each other. Although only one middle section is labeled as 106 and is discussed herein, but the discussion applies equally to each of the middle sections. In the typical middle section 106, incident light rays 122, 123 with beam width between 122 and 123 are converged by a convex (like spherical) surface 105 to become light rays 132, 133 directed towards a focal point 107F, which is also the focal point of a convex reflection (like hyperbolic reflection) mirror 107 formed at a surface of the rear portion of the device 100 opposite to the aperture. Again, the convex reflection mirror 107 may be formed by forming the rear surface of the device with an appropriate convex or hyperbolic shape, and coating the shaped surface with a light-reflecting material such as a metal, white pigment, etc. The light rays 132, 133 are reflected and converged to become light rays 142, 143 directed towards the collimating mirror 111 and focal point 111F in section 109. The mirror 111 collimates and reflects the light rays 142, 143 to become exit light rays 152, 153 with a beam width between 152 and 153. Thus, the incident light rays 122, 123 with beam width between 122 and 123 have been compressed and bent by the middle section 106 to become the exit light rays 152, 153 with beam width between 152 and 153.

In bottom section 109, incident light rays 124 and 125 with beam width between 124 and 125 shine on a convex (like a spherical) surface 108 which converges to become light rays 134, 135 towards a concave (like parabolic) mirror 112 with a focal point 112F. The concave mirror 112 is disposed adjacent the collimating mirror 111 in this embodiment. Light rays 134, 135 are bent and converged by the concave mirror 112 to become light rays 144, 145 directed towards another, but smaller collimating mirror 113 with its focal point on 112F. Light rays 144, 145 are collimated and reflected to become exit light rays 154, 155 which exit the device 100 with beam width between 154 and 155. Thus the incident light rays 124, 125 with beam width between 124 and 155 have been compressed and bent by the bottom section 109 to become the exit light rays 154, 155 with beam width between 154 and 155.

As described above, all incident light rays, 120, 121 shinning on the top section, 122, 123 shinning on the typical middle section, and 124, 125 shinning on the bottom section, are compressed and collimated to exit light rays 150, 151, 152, 153, 154, 155 with light beam width 136. Exit light beam width 136 is only a fraction of incident light beam width 126. Also because it is divided into an array of sections, the hybrid lens 100 becomes very much thinner respect to height and depth of the hybrid lens 100 in comparison to conventional optical devices. Additionally, as shown all of the components of the hybrid optical device 100 are interconnected by the lens 100 which is a unitary member will be contained within a viewpoint of an observer facing toward the incident light receiving sections of the device.

Again, light rays exiting the device 100 travel in a direction parallel to the that of the light rays entering the device 100. When exit light rays are thus made parallel by collimating mirrors 111 and 112, it is typically for applications which require compressed light beam width only. For example, when a hybrid optical device of the invention is to be used in an optical cloaking system or the like, it may be desirable to compress beam width or beam height only for the purpose of minimizing distortion which a person may perceive when looking at the optical device as discussed in co-pending application Ser. No. 13/714,770. However, by changing collimating mirrors 111 and 112 to hyperbolic mirrors, the exit light rays converge in both height and width to a focal point, and would be used for the applications which require a compressed light beam with a focal point.

Many other modifications to the hybrid optical device of FIG. 1 are possible, including the following. First, while all the sections 101, 105, 108 are depicted as having the same size/height, they need not have the same size/height, and there are applications where it may be desirable for one or more sections to have a different size/height from the other sections. For example, it may be desirable for the bottom section 108 to be smaller or much smaller than the other sections, e.g., for an optical cloaking application it can be desirable for the compressed light rays to pass around a cloaked object in as small a space as possible. Second, while the device 100 includes a number of reflection surfaces 103, 107 which correspond to the number of top and intermediate sections 101, 105, it is possible to have a smaller number of the reflection surfaces 103, 107, such that one of the reflections surfaces may receive the compressed light from more than one of the top and intermediate sections 101, 105. In this case, however, there may be some interference between the compressed light of the multiple sections being received by the reflection surface. As a practical matter, however, it is more efficient and higher quality to have a one-to-one correlation between the sections and the reflection surfaces. Given that a size (in height and width dimensions) of the device is largely dictated by the size of the light receiving surface of same, the rear portion of the device on which the reflecting surfaces are formed will not effectively increase the overall size of the device to any significant extent even if there is a one-to-one correlation between the sections and the reflection surfaces. Third, while the compressed light exits the device 100 in the lowest section thereof, the compressed light can be redirected to exit from any portion or portions of the device and in any desired directions(s).

Figure 2:
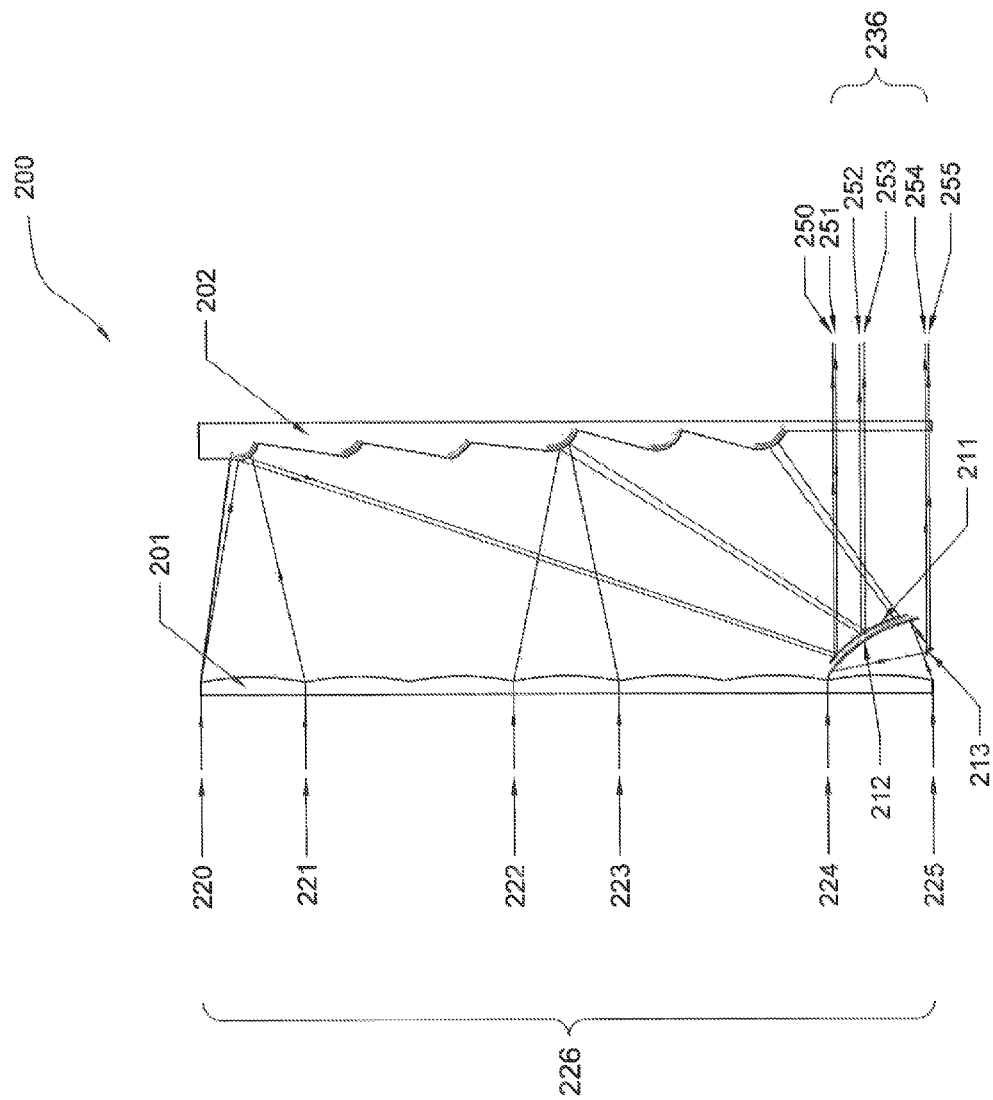
FIG. 2 is a side cross-sectional view of a hybrid optical device according to a second illustrative embodiment of the present invention and which is similar to the hybrid optical device of FIG. 1 except that the device of FIG. 2 includes multiple members which are spaced from each other.

Referring now to the FIG. 2, there is shown a hybrid optical device according to a second illustrative embodiment of the present invention, generally denoted by reference numeral 200, wherein FIG. 2 is a side cross-sectional view of the device. As will be recognized, the hybrid optical device 200 according to the second embodiment of FIG. 2 achieves essentially the same result as the hybrid optical device in the first embodiment of FIG. 1. However, the device 200 has a multiple piece construction, rather than the unitary one piece constructions of the device 100, although the components of device 200 may be spaced from each other in essentially the same spatial arrangement as the corresponding portions of the device 100. Forming the device 200 in multiple pieces desirably reduces the amount of materials used in the formation as compared to the device 100 as the space between members 201, 202 is simply air or some other fluid. Also by forming the device 200 in multiple pieces it gives some flexibility in arranging the pieces relative to each other.

As depicted, the device 200 includes a lens 201 which receives incoming light as represented by rays 220-225, a reflection member 202 having several reflection surfaces formed thereon, collimating mirrors 211, 213, and concave mirror 212. The lens 201 is in a form of a single, unitary, solid member made of transparent optical material with positive refractive index, such as acrylic resin, polycarbonate resin, glass, or the like, and includes multiple sections which form an array of convex (like spherical) surfaces so that each of these sections compresses and redirects a portion of the light entering the aperture of the lens. The reflection member 202 may be formed of any appropriate material which may be formed to include the appropriately shaped reflection surfaces, including synthetic resins having light-reflecting material(s) provided with the reflection surfaces, metals, etc. The collimating mirrors 211, 213 and the concave mirror 212 may be formed similarly as the mirrors 111, 112, 113 in the device 100, and the mirrors 211, 212, 213 may be formed integrally with the lens 201 as a single, unitary member. This construction of device 200 is advantageous over the construction of the device 100 because it reduces both weight and light ray attenuation. By using the hybrid optical device 200, incoming light entering the aperture surface at the left side of FIG. 2 is converged and reflected along light ray paths which are essentially the same as in FIG. 1. Details of the light ray paths are omitted. Again, as shown all of the components of the hybrid optical device 200 are configured to be disposed in a fixed relation to each other, and when so disposed will be contained within a viewpoint of an observer facing toward the incident light receiving sections of the device.

Figure 3:
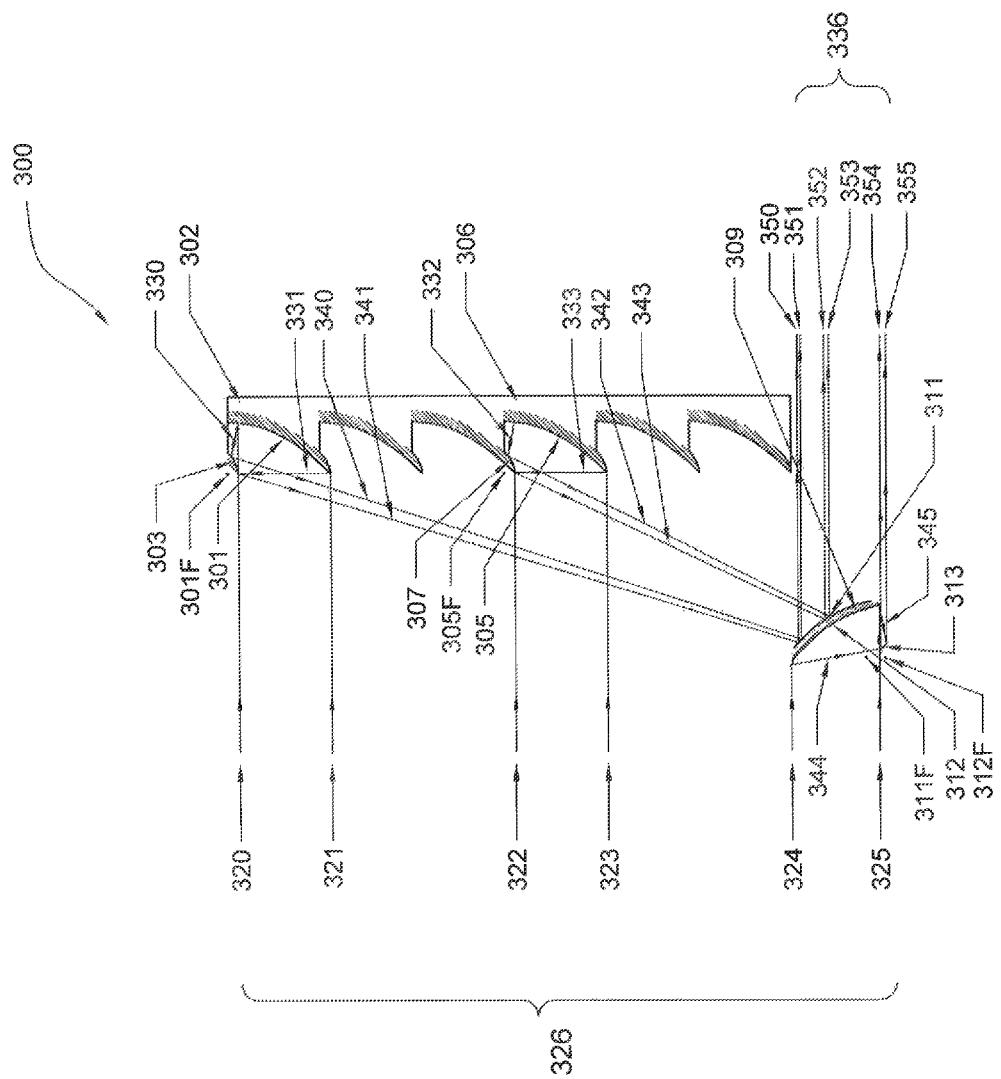
FIG. 3 is a side cross-sectional view of a hybrid optical device according to a third illustrative embodiment of the present invention and which is similar to the hybrid optical device of FIG. 1 except that the device of FIG. 3 also includes multiple members which are spaced from each other, and need not include any optically transparent material in its construction.

Referring now to the FIG. 3, there is shown a hybrid optical device according to a third illustrative embodiment of the present invention, generally denoted by reference numeral 300, wherein FIG. 3 is a side cross-sectional view of the device. As will be recognized, the hybrid optical device 300 according to the second embodiment of FIG. 3 achieves essentially the same result as the hybrid optical devices 100, 200 in the first and second embodiments of FIGS. 1, 2. However, the device 300 has an all reflection mirror construction, which is advantageous and desirable for purposes of using non-transparent material, or materials which do not have a positive refraction index, and minimum light ray attenuation. For example, this application may be particularly advantageous for applications involving extreme temperatures.

The device 300 includes a main member which is divided into multiple sections, including a top section 302 and intermediate sections 306, again, in which the specific number of intermediate sections 306 will depend on the size (height) of the device 300. The depicted typical middle section 306 is representative of all intermediate sections between the top section 302 and a bottom section 309. Each section of the main member includes a concave reflection (like parabolic) mirror which receives a portion of the light incoming to the device 300, converges, and redirects same, and a convex reflection (like hyperbolic surface) mirror which receives the converged, redirected light from the concave mirror and further converges and redirects same. The device 300 also includes collimating mirrors 311, 313 and concave mirror 312 disposed at a lower level than the main member and in a spatial arrangement with the main member similar to that in the devices 100, 200. The collimating mirrors 211, 213 and the concave mirror 212 may be formed similarly as the mirrors 111, 112, 113 in the device 100.

In top section 302, incident light rays 320, 321 with beam width between 320 and 321 shine on a concave reflection (like parabolic) mirror 301 to become light rays 330, 331 directed towards a focal point 301F, which is also the focal point of a convex reflection (like hyperbolic surface) mirror 303. The light rays 330, 331 are reflected and converged to become light rays 340, 341 towards a focal point 311F in bottom section 309, where a collimating mirror 311 has a focal point 311F. The light rays 340, 341 are collimated and reflected to become exit light rays 350, 351 with beam width between 350 and 351. Thus the incident light rays 320, 321 with beam width between 320 and 321 have been compressed and bent by the top section 302 to become the exit light rays 350, 351 with beam width between 350 and 351. In a typical middle section 306, incident light rays 322, 323 with beam width between 322 and 323 shine on a concave reflection (like parabolic) mirror 305 to become light rays 332, 333 directed towards a focal point 305F, which is also the focal point of a convex reflection (like hyperbolic reflection) mirror 307. The light rays 332, 333 are reflected and converged to become light rays 342, 343 towards the focal point 311F in section 309, where the collimating mirror 311 has a focal point 311F. The light rays 342, 343 are collimated and reflected to become exit light rays 352, 353 with beam width between 352 and 353. Thus, the incident light rays 322, 323 with beam width between 322 and 323 have been compressed and bent by the middle section 306 to become the exit light rays 352, 353 with beam width between 352 and 353.

In bottom section 309, incident light rays 324 and 325 with beam width between 324 and 325 shine on the concave reflection (like a parabolic) mirror 312 with a focal point 312F which converges to become light rays 344, 345 directed towards another collimating mirror 313 with its focal point on 312F. Light rays 344, 345 are collimated and reflected to become exit light rays 354, 355 with beam width between 354 and 355. Thus, the incident light rays 324, 325 with beam width between 324 and 355 have been compressed and bent by the bottom section 309 to become the exit light rays 354, 355 with beam width between 354 and 355. The bottom section is very similar to the bottom sections of the devices 100, 200 according to the first and second embodiments of the present invention.

As detail description above, all incident light rays, 320, 321 shinning on the top section, 322, 323 shinning on the typical middle section, and 324, 325 shinning on the bottom section, are compressed and collimated to exit light rays 350, 351, 352, 353, 354, 355 with light beam width 336 which is only a fraction of incident light beam width 326. Also because of array of sections, the hybrid lens 300 becomes remarkably thinner in respect to height and depth of conventional optical devices. Again, as shown all of the components of the hybrid optical device 300 are configured to be disposed in a fixed relation to each other, and when so disposed will be contained within a viewpoint of an observer facing toward the incident light receiving sections of the device.

Again, in the depicted embodiment of device 300 the exit light rays are directed by the collimating mirrors 311 and 313 in a direction parallel to that of the incident light rays entering the device 300, and it is appropriate for applications which require the incoming light to be compressed in light beam width only. However, by changing collimating mirrors 311 and 313 to hyperbolic mirrors, the exit light rays will converge in both height and width dimensions to a focal point. Such a modification would be desirable for applications which require a compressed light beam output with a focal point.

Figure 4:
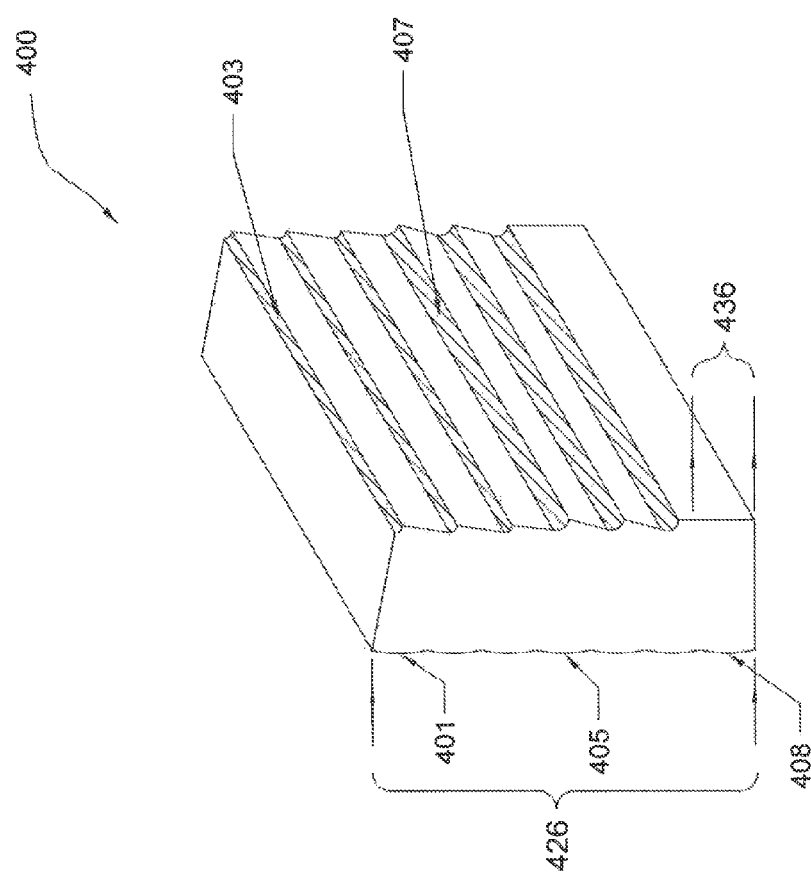
FIG. 4 is a rear side perspective view of a hybrid optical device according to a fourth illustrative embodiment of the present invention similar to the device shown in FIG. 1, and wherein the device has a rectangular plane construction so that the light rays are only compressed in viewing height, but not in viewing width.

FIG. 4 shows a rear perspective view of a hybrid optical device 400 according to a fourth illustrative embodiment of the present invention which corresponds to the device 100 shown in FIG. 1, which has rectangular plane construction in which a front aperture surface includes plural convex surfaces 401, 405, 408 formed in an array for receiving incident light rays with beam width 426 the same as in the arrangement of device 100, but wherein a rear surface of the device 400 includes linearly-extending surfaces 403, 407 which are convex shaped in cross-section and have reflective material(s) coated thereon. Although not shown in FIG. 4, the device 400 also includes collimating mirrors and a concave mirror similar to the mirrors 111, 112, 113 in the device 100, and which extend linearly the full width of the device 400 like the surfaces 403, 407. After being converged and reflected by the convex surfaces 401, 405, 408, the surfaces 403, 407, and the mirrors, light rays entering the device 400 exit the device 400 as light rays with beam width 436, which is compressed to a fraction of the incident light rays with beam width 426. As with the device 100, the light rays are only compressed in viewing height, but not in viewing width.

Figure 5:
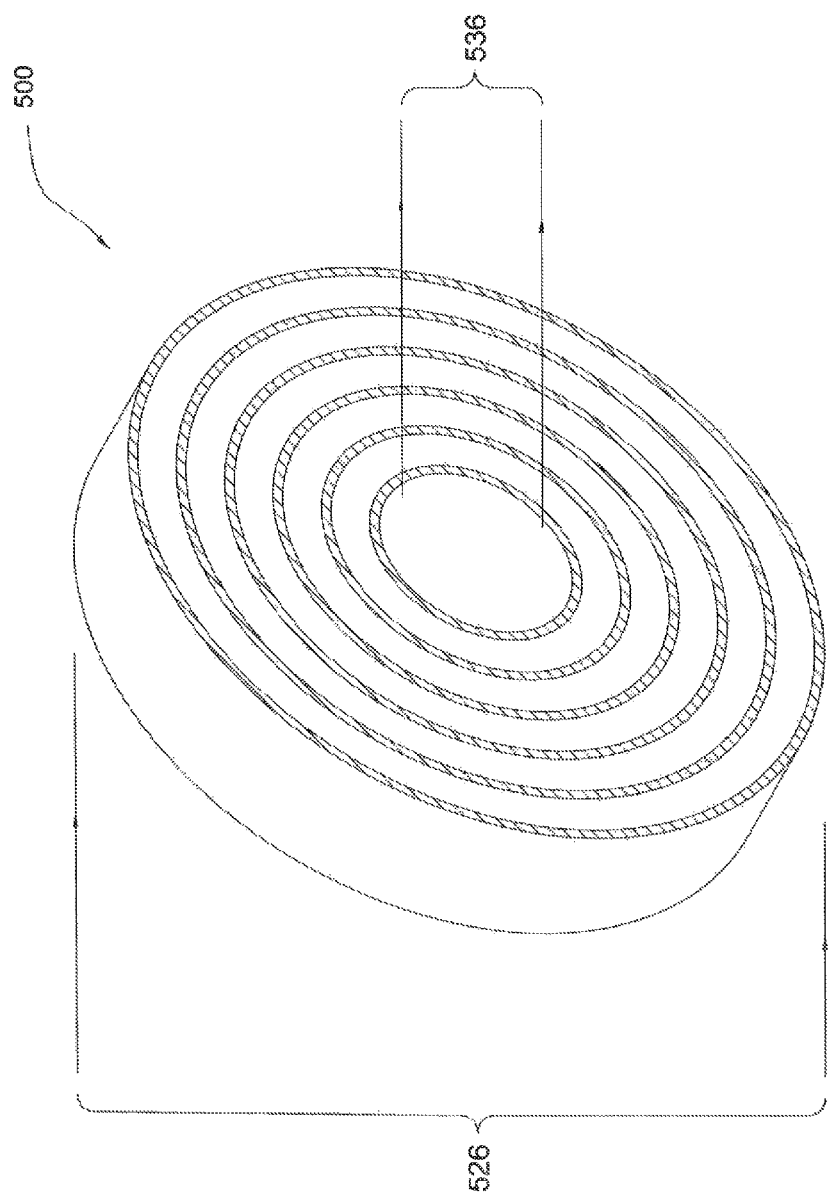
FIG. 5 is a rear side perspective view of a hybrid optical device according to a fifth illustrative embodiment of the present invention, and which is similar to the embodiment of FIG. 1 except that it has a circular cross-sectional shape rather than rectangular and outputs light from a central portion thereof rather than a peripheral portion thereof.

FIG. 5 shows a shows a rear perspective view of a hybrid optical device 500 according to a fifth illustrative embodiment of the present invention. The device 500 is similar to the devices 100, 400 of FIGS. 1 and 4, but has disc or circular shape construction, achieved by rotating 360° the hybrid lens 100 in FIG. 1. Incident light rays with beam with 526 shine on a front aperture surface of hybrid lens 500, and after being converged and reflected, the light rays exit with beam width 536 through a central portion of a rear surface of the device 500. The exiting light is compressed to a fraction of the incident light rays with beam with 526, so that the light rays are compressed in both viewing height and in viewing width.

Figure 6A:
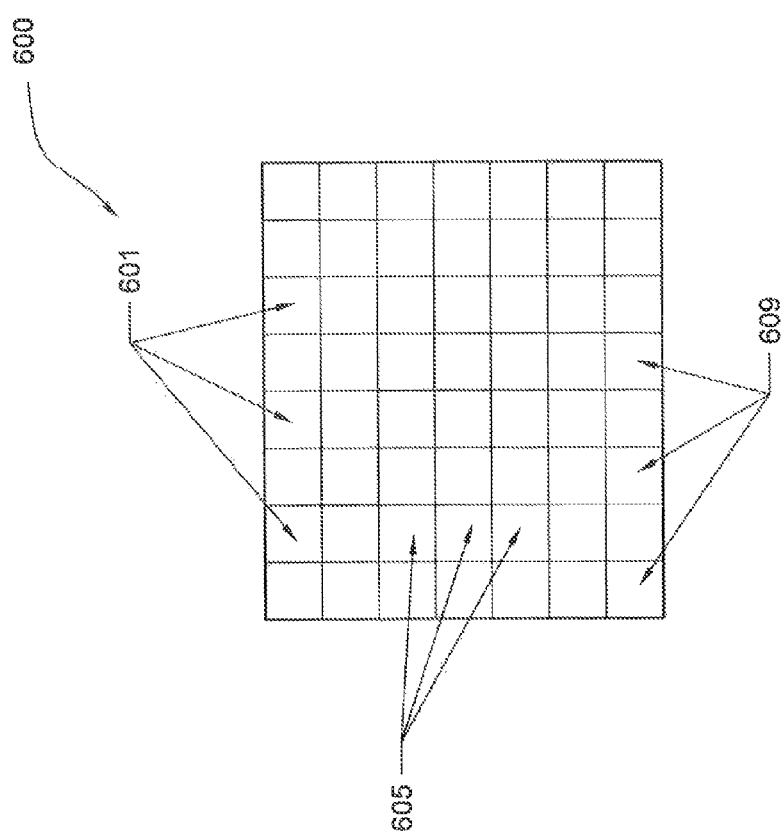
Figure 6B:
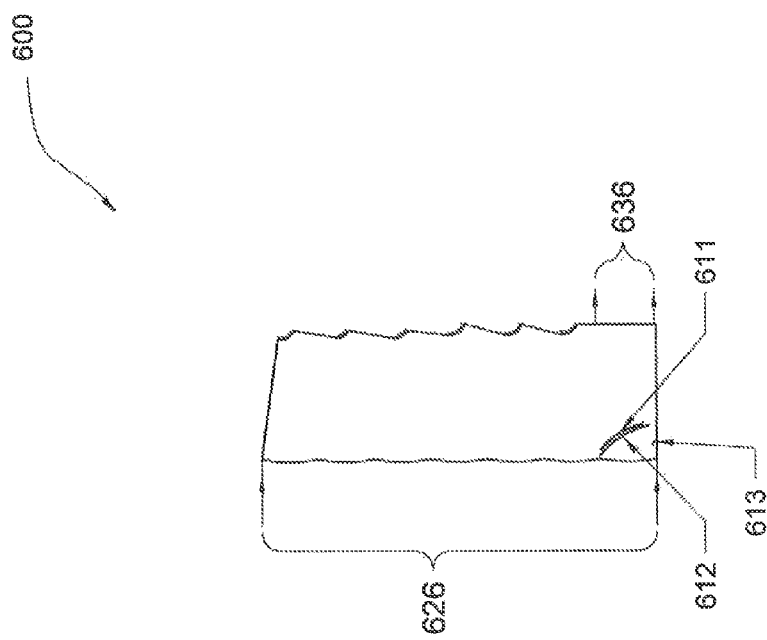
Figure 6C:
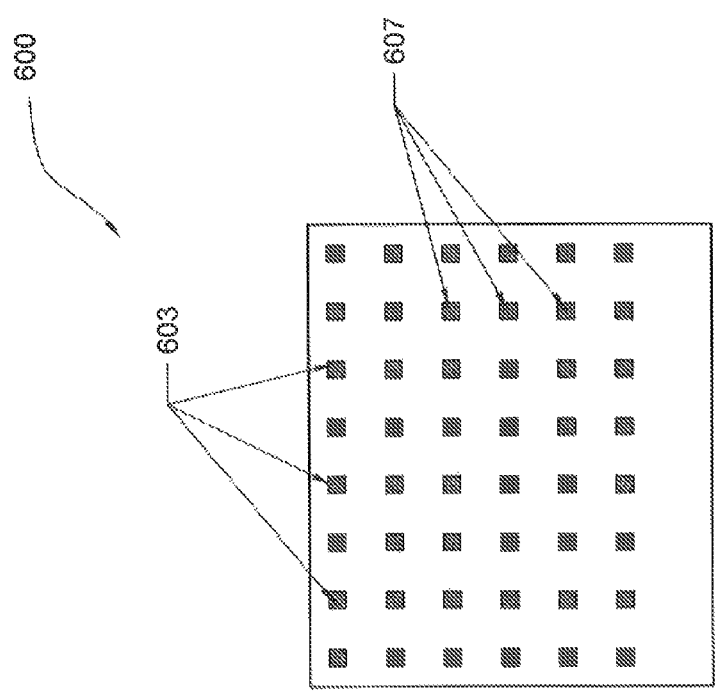

FIGS. 6A-6C show a hybrid optical device 600 according to a sixth illustrative embodiment of the present invention. Although a side cross-sectional view of the device 600 as shown in FIG. 6B appears the same as the side cross-sectional view of the device 100 as shown in FIG. 1, the device 600 has a rectangular plane construction formed by further dividing an incident light surface in array in the hybrid optical device 100 in FIG. 1 along lines extending vertically where incident light rays with beam width 626 shine on the surface of hybrid lens 600, such that the surface is divided in an array of elements 601, 605, 609 in both width and height dimensions as shown in FIG. 6A. Each of the elements 601, 605, 609 of the array, which in FIG. 6A has a square shape, individually compresses and bends light rays entering that element. The compressed, bent light from the elements 601 in the top section or row and from the elements 605 in each of the intermediate sections or rows is directed toward a corresponding hyperbolic (like convex) reflection mirror 603 or 607 formed in a rear surface of the device 600, which further converges and redirects the light to a collimating reflecting mirror 611 in the bottom row or section of the device 600 so that the converged light rays are redirected to exit out of the device in a direction substantially parallel to the direction in which the light enters the elements 601, 605. Elements 609 in the bottom section or row converge and redirect incoming light rays toward concave mirror 612, which further converges and redirects the light toward collimating mirror 613 so that light entering the bottom section or row of device 600 also exits out of the device in a direction substantially parallel to the direction in which the light enters the elements 609. After converging and reflecting, all of the exit light rays are the light rays with beam width 636, which is compressed to a fraction of the incident light rays that enter the device 600 with beam width 626, so that the light rays are compressed in both viewing height and in viewing width. The collimating mirrors 611, 613 and the concave mirror 612 are disposed in the bottom section or row of device 600 similarly to and perform essentially the same functions as the corresponding mirrors 111-113, 211-213, and 311-313 in the first-third illustrative embodiments.

Although the array elements 601, 605, 609 are depicted as having a square shape, each element of array can be any shape, like rectangular, square, round, triangle, hexagon, etc., while achieving essentially the same advantageous effect.

Figure 7A:
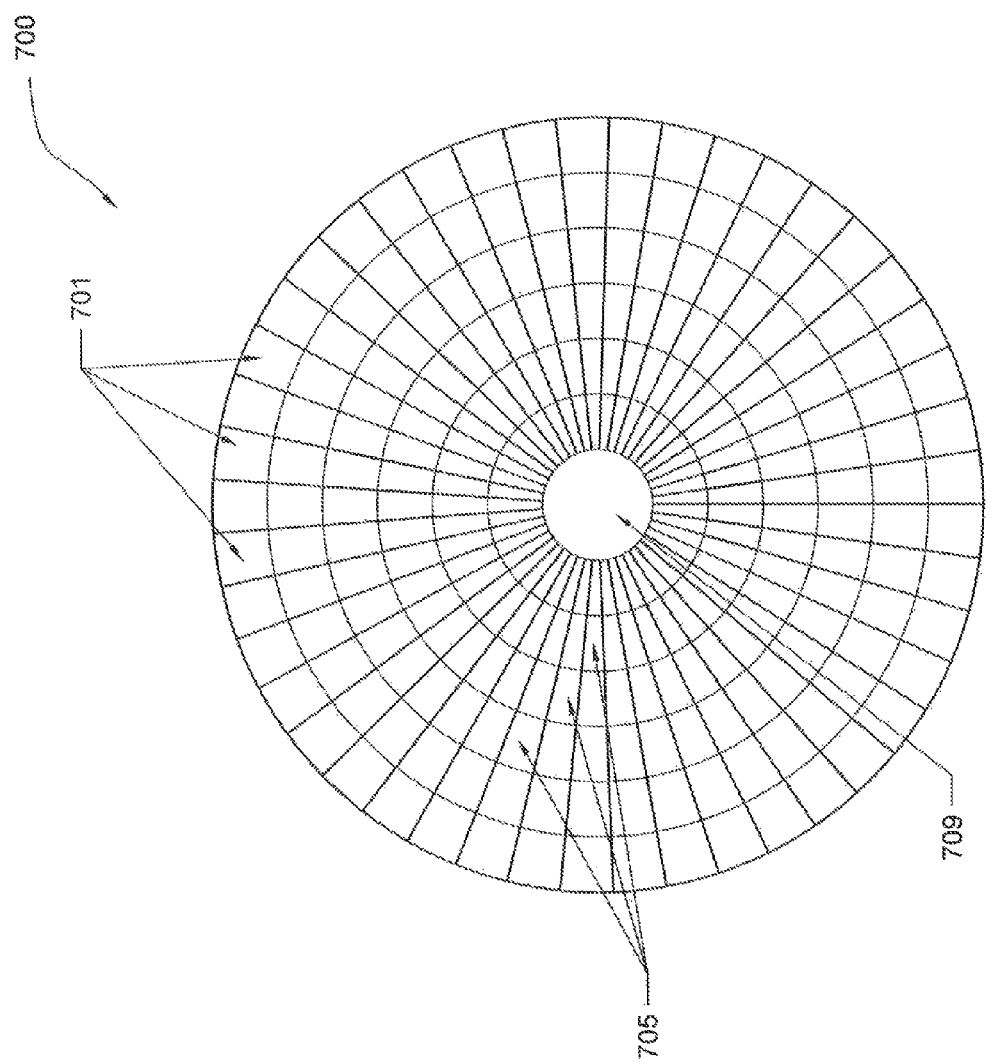
Figure 7B:
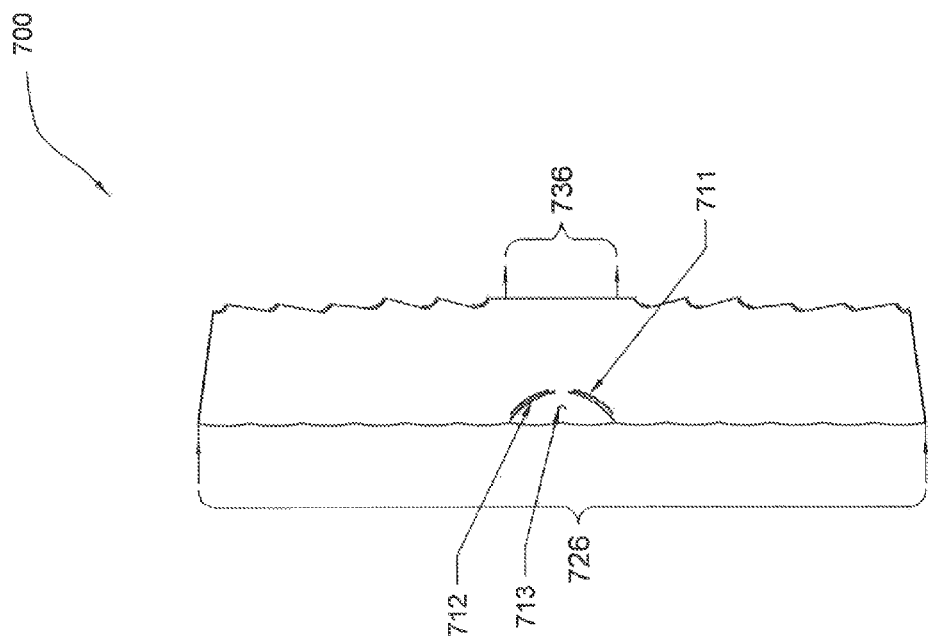
Figure 7C:
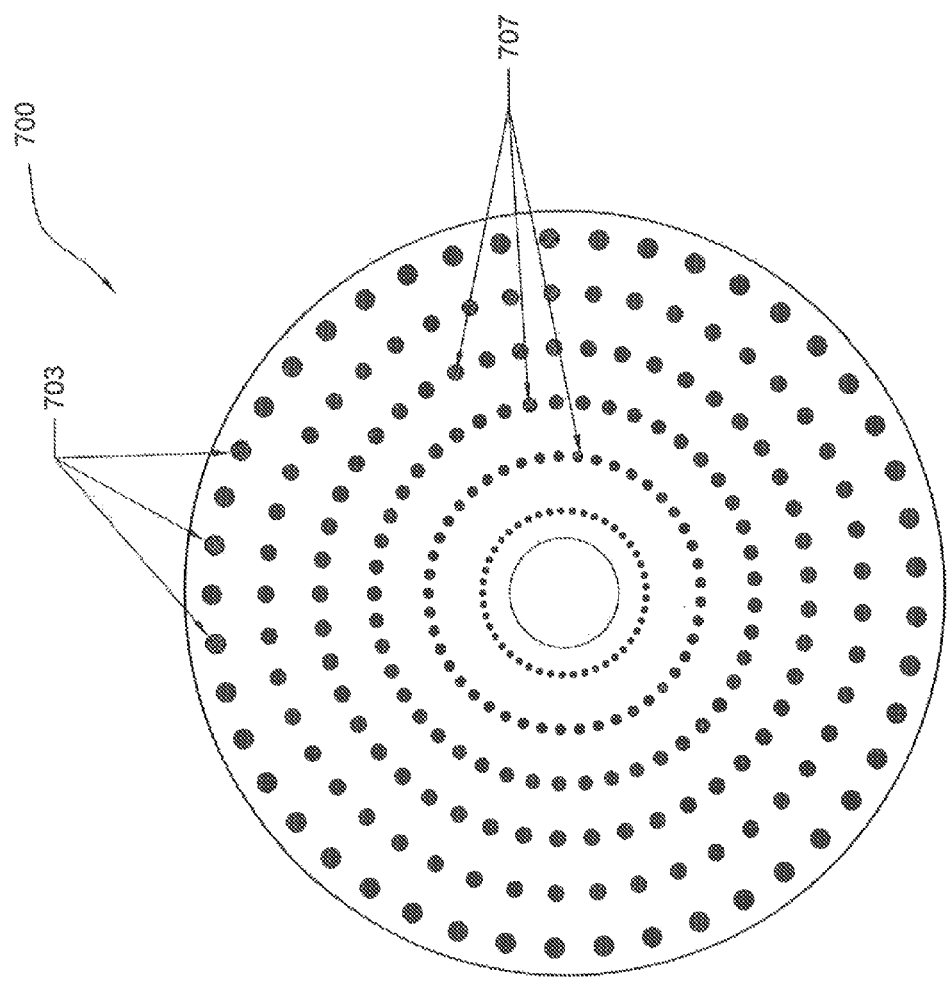

FIGS. 7A-7C show a hybrid optical device 700 according to a seventh illustrative embodiment of the present invention which is similar to the sixth illustrative embodiment of FIGS. 6A-6C except that the device 700 has a circular plane construction rather than rectangular or square plane construction, and has components with different shapes and arrangements than those of the device 600 consistent with the circular cross-sectional shape of device 700. Because the device 700 has the circular plane construction it is also somewhat similar to hybrid optical device 500 in FIG. 5 which also has a circular plane construction. However, an aperture or incident light surface of the device 700 where incident light rays with beam width 726 shine on the surface of hybrid optical device 700 is divided in an array of elements along first lines extending concentrically around a center of the aperture surface and second lines extending radially outward from the center. By this, elements 701 in the outer ring or section have a substantially square or rectangular shape, while elements 705 in the intermediate rows or sections have a substantially rectangular shape which becomes tapered inwardly toward the center to an increasingly greater degree as the rows or sections get closer to the center.

As with the elements 601, 605 of the device 600, each of the elements 701, 705 of device 700 individually compresses and bends light rays entering that element. The compressed, bent light from the elements 701 in the outermost section or row and from the elements 705 in each of the intermediate sections or rows is directed toward a corresponding hyperbolic (like convex) reflection mirror 703 or 707 formed in a rear surface of the device 700, which further converges and redirects the light to a collimating reflecting mirror 711 in the center section or row of the device 700 so that the converged light exits out of the center of the device in a direction substantially parallel to the direction in which the light enters the elements 701, 705. Light entering the center section or row 709 of the device is converged and redirected toward concave mirror 712, which further converges and redirects the light toward collimating parabolic mirror 713 so that light entering the center section or row 709 of device 700 is also redirected to exit out of the center of the device 700 in a direction substantially parallel to the direction in which the light enters the section or row 709. The collimating mirror 711 and the concave mirror 712 each have an opening formed in a central part thereof and through which the light redirected by collimating mirror 713 passes.

Similarly to the elements 601, 605, 609, each array element 701, 705, 709 can be any shape, like rectangular, square, round, triangle, hexagon, etc. After converging and reflecting, the exit light rays are the light rays with beam width 736, which is compressed to a fraction of the incident light rays with beam width 726, so that the light rays are compressed in both viewing height and in viewing width.

While some illustrative embodiments of the hybrid optical device according to the present invention have been disclosed herein with reference to FIGS. 1-7C, below will be described some specific, exemplary applications for the hybrid optical device of the present invention. Such exemplary applications are not intended to be exhaustive of the practical applications which may benefit from use of the hybrid optical devices according to the present invention which have greatly reduced depth and size. Many and numerous other useful applications for the hybrid optical devices will be apparent to persons of ordinary skill in the art.

Figure 8:
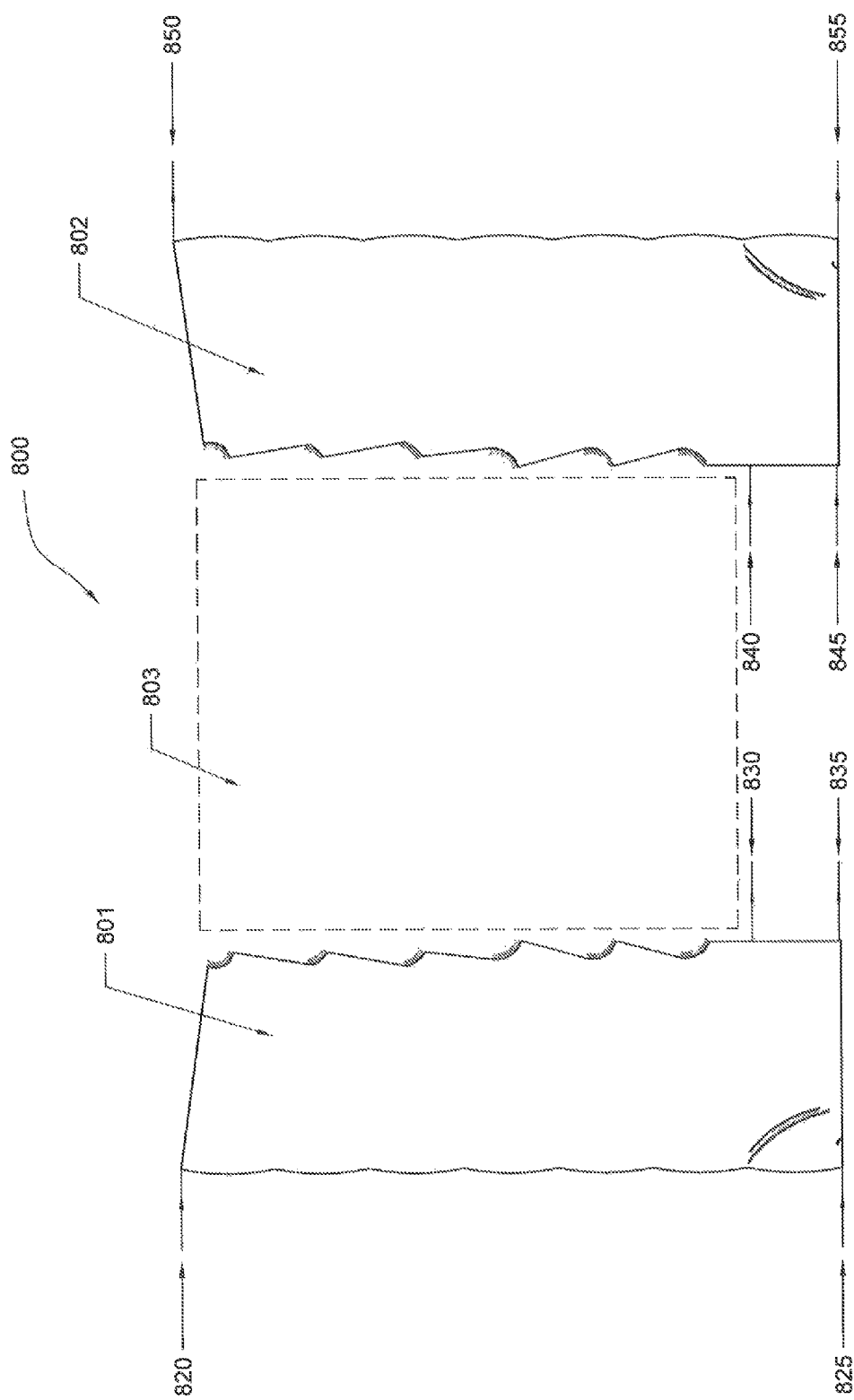
FIG. 8 is a side cross-sectional view of an application involving two of the hybrid optical devices of FIG. 1 which are placed symmetrically opposite to each other so as to form a cloaking space therebetween in which an object may be disposed for being hidden view.

In FIG. 8, an illustrative embodiment in the form of an optical invisibility cloaking system 800 is depicted in side cross-sectional view, which system is composed by two hybrid optical devices 801 and 802 disposed in symmetrical relation to each other so as to create a cloaking space 803 therebetween. This optical invisibility cloaking system is quite similar to optical cloaking systems disclosed in FIGS.

1-8 of prior application Ser. No. 13/714,770, but may use hybrid optical devices according to the first, fourth or sixth illustrative embodiments of the present invention, rather than the optical lens as disclosed in FIGS. 1-8 of prior application Ser. No. 13/714,770 so that the depth of the optical devices and correspondingly the size of the overall system is greatly reduced in comparison to the systems of prior application Ser. No. 13/714,770. Of course, it is also possible to use hybrid optical devices according to any of the illustrative embodiments of the present invention in such a optical invisibility cloaking system.

Again, the hybrid optical devices 801, 802 in the system of FIG. 8 can be the same as the hybrid optical devices or lenses 100, 400, or 600 in present FIG. 1, 4, or 6A-6C, and are disposed symmetrically opposite to each other so that between the front hybrid lens 801 and back hybrid lens 802 there is formed the optical cloaking cavity 803. Incident light rays with beam width between 820 and 825 are compressed and bent to become exit light rays with beam width between 830 and 835 as described the hybrid lens 100 in FIG. 1. Because the exit light rays have much narrower beam width between 830 and 835, it leaves a cavity 803 where there are no light rays going through. The exit light rays with beam width between 830 and 835 keep traveling adjacent to and below the cavity 803 to become incident light rays 840, 845 with beam width between 840 and 845 of the hybrid lens 802. Because the light rays passing through the hybrid lens 802 are decompressed and redirected exactly opposite to the compression and redirection that occurred when the light rays passed through hybrid lens 801, the outcome becomes the light rays 850, 855 with beam width between 850 and 855. Since the outcome light rays 850, 855 with beam width between 850 and 855 are the same as the incident light rays 820, 825 with beam width between 820 and 850, a person viewing into the left side of hybrid lens 801 or the right side of hybrid lens 802 will see the background existing on the opposite side of the system 800 as if the system 800 and anything placed in the cavity 803 did not exist. In other words, any object disposed in the cavity 803 becomes invisible to the person.

Some advantages of the system 800 according to this application include that it is able to optically cloak objects using common materials that are readily available, while the hybrid optical lenses 801, 802 can have very small depth and correspondingly the size of the overall system can greatly reduced in comparison to the systems of prior application Ser. No. 13/714,770. Other advantages and considerations relating to such an optical cloaking system are discussed in prior application Ser. No. 13/714,770 and also apply to the system 800. The system 800 may be modified in various ways. For example, one possible modification is to use only one hybrid lens for cloaking an object such as shown in FIGS. 17-18 of prior application Ser. No. 13/714,770, which may be appropriate in situations where a background image is one continuous color such as the sea or sky behind a military craft being cloaked. Further, although the bottom sections of the two devices 801, 802 are depicted as having the same size as the other sections of these devices, the bottom sections may be constructed to have a much smaller size than the other sections as discussed above. Other possible modifications correspond to the systems shown in FIGS. 8-16 of prior application Ser. No. 13/714,770, but which utilize the hybrid optical devices according to the present invention.

Figure 9:
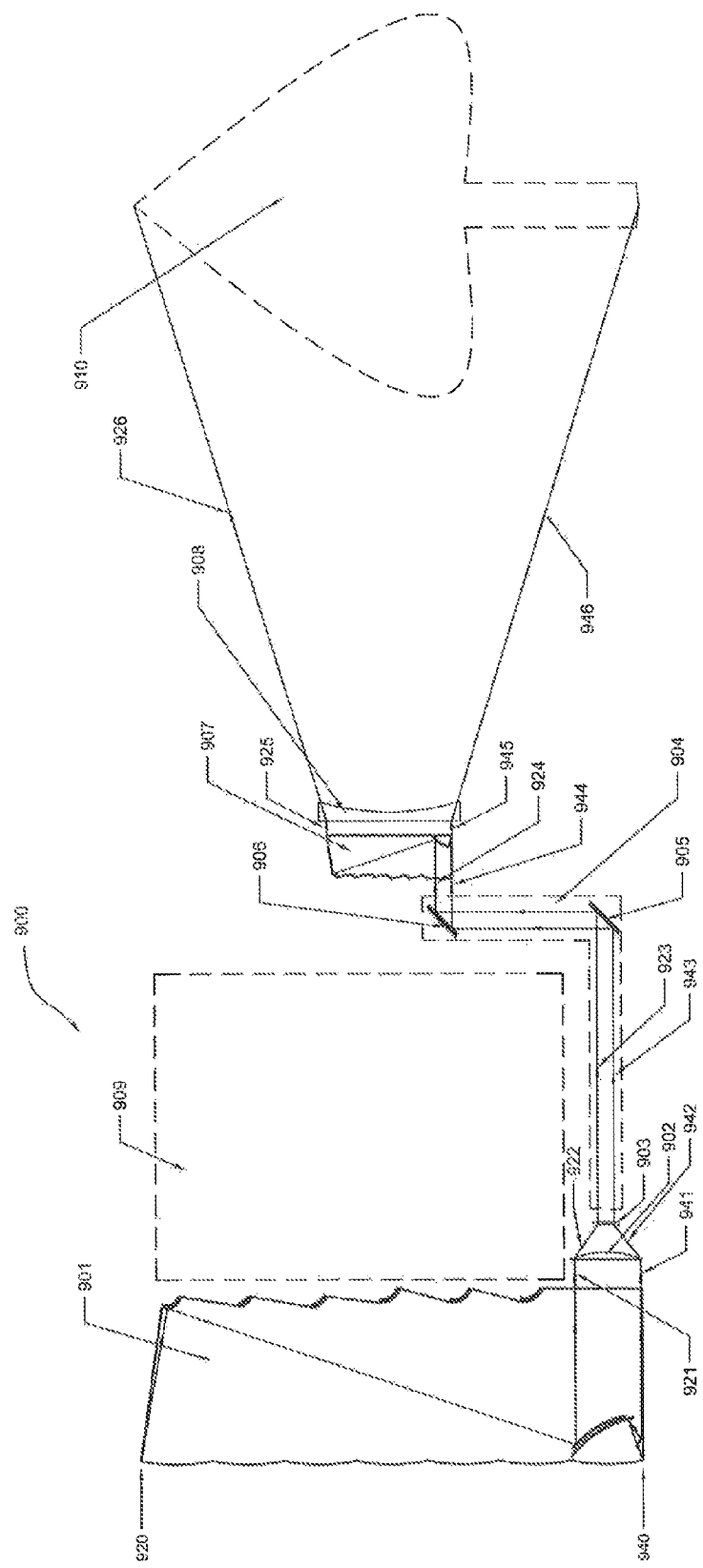
FIG. 9 is a side cross-sectional view of an application similar to that of FIG. 8, but in which one of the hybrid optical devices is greatly reduced in size in comparison to the other and a concave lens is provided in association with the smaller hybrid optical device.

FIG. 9 shows an optical system 900 in cross sectional view which is a variation of the optical cloaking system 800 in FIG. 8, and is particularly useful in situations where it is impractical or undesirable to have a full size hybrid optical device on one side of an object which is being optically cloaked. For example, one such situation is an interior room of a building such as a beach house or skyscraper which has transparent panels or windows covering all or most of an exterior side thereof so that the scenery outside of the building can be viewed by persons inside exterior rooms of the building. For interior rooms of such a building which do not include windows exposed to the outside, it would be desirable to optically cloak a light-impervious walls of such rooms using an optical cloaking system of the present invention to give persons within the rooms a view of the scenery outside of the building. However, if a full size hybrid device is used toward the outside of the building this may undesirably block or obscure the view of persons in the exterior rooms of the building which have transparent windows and normally have a fine view of the scenery outside of the building. Hence, in such a situation a smaller size hybrid optical device is used toward the outside of the building so that it does not block or obscure the view of persons in exterior rooms of the building.

As depicted, the system 900 includes a full size front hybrid optical device or lens 901 which corresponds to a hybrid lens according to the first, fourth or sixth illustrative embodiments shown in FIGS. 1, 4, and 6 of the present invention, a convex lens 902 and a concave lens 903 disposed to receive compressed light rays exiting the hybrid lens 901, further compress and redirect same, reflecting mirrors 905, 906 which redirect light exiting the concave mirror 903, a very small scale back hybrid optical device or lens 907 disposed symmetrically opposite to the front hybrid lens 901 which decompresses the light rays and directs them to exit in a direction substantially parallel to a direction of light rays 920, 940 entering the front hybrid lens 901, and a concave lens 908 which receives the light rays exiting the back hybrid lens 907 and expands same.

When typical horizontal incident light rays 920 and 940 having a beam width between them enter the hybrid lens 901 via the entire height of its front side, the light rays are compressed, bent, and exit to be light rays 921 and 941 with compressed beam width. Light rays 921 and 941 then go through convex lens 902, which further converges to light rays 922 and 942. Light rays 922 and 942 go through concave lens 903, which collimates to light rays 923 and 943. Convex lens 902 and concave lens 903 could alternatively be provided integrally with and as part of the hybrid lens 901. The compressed light rays 923 and 943 travel through a space or light duct beneath object cloaking cavity 909, which is defined between the hybrid lenses 901, 907, and then are redirected through another light duct or space 904 by the reflector mirrors 905 and 906 to become light rays 924 and 944. The light duct 904 goes around the object cavity 909, where an object such as a wall, a building, etc. is hidden. Light rays 924 and 944 enter the very small scale back hybrid lens 907 (very small as compared to front hybrid lens 901), which decompresses, bends, and exits light rays to become light rays 925 and 945. Light rays 925 and 945 go through concave lens 908 to become diverged light rays 926 and 946. Concave lens 908 could alternatively be provided integrally with and as part of the very small back hybrid lens 907, rather than as a separate component as shown.

In the system 900 of this application, the concave lens 908 may be disposed at a predetermined distance to a fixed background, e.g., a tree 910 as shown, so that light rays 926 and 946 with beam width reach the same beam width of incident light rays 920 and 940. Therefore, the tree 910 would appear the same physical size to viewer looking at a front of the hybrid lens 901.

However, when the distance between the concave lens 908 and the tree 910 changes, the background size to the viewer will change. The closer to the concave lens, the bigger the object will appear to be. As a practical matter, this application is best for viewing a fixed background or scene, where the distortion of size is not important. Again, a primary advantage of this application is that it minimizes the size back hybrid lens that could block or obstruct certain views, and one particularly useful application is in architectural design. With this application the light rays may be compressed to such a significant extent that the bottom section of device 901, the lenses 902, 903, the light duct beneath the cloaking cavity, light duct 904, mirrors 905, 906, and lower section of device 907 may be conveniently disposed in very inconspicuous locations. For example, they may be disposed within frame components of a building completely hidden from view.

The system 900 may be modified in various ways. For example, one possible modification is to place a small scale object in the small space or duct beneath the object cloaking cavity 909 while eliminating the components 905-908. When the compressed light strikes the small scale object it will appear full size to the viewer looking at the front side of the hybrid lens 901. This would allow an object in the object cloaking cavity 909 to be disguised as opposed to just hidden from view.

Figure 10:
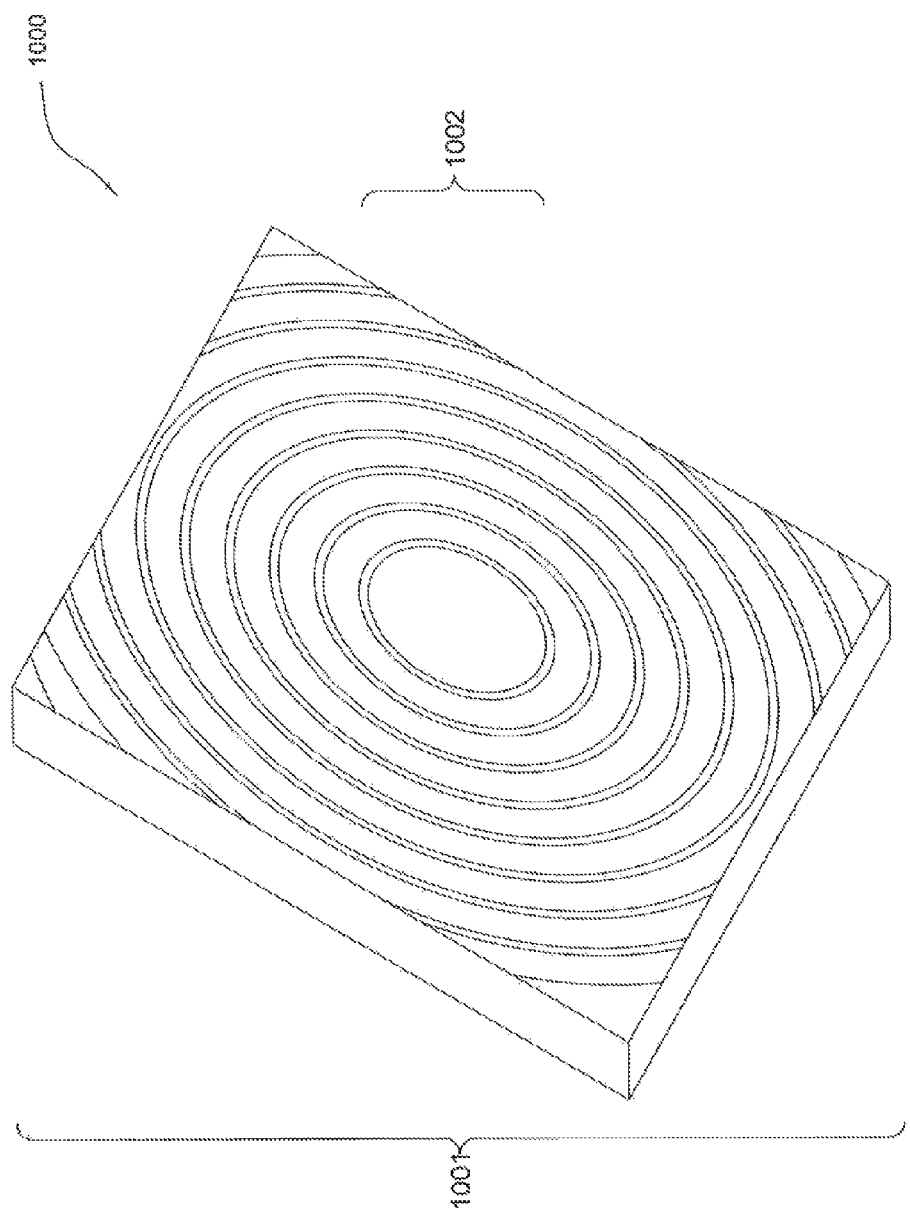
FIG. 10 is a rear side perspective view of a modification of the hybrid optical device of FIG. 5 in which the outer periphery is rectangular or square in shape rather than circular. This modification is particularly useful in situations where a plurality of the hybrid optical devices are combined together to form a larger hybrid optical device.

FIG. 10 presents another application of a hybrid optical device according to the present invention in the form of hybrid lens 1000 which is in rectangular or square shape and which outputs compressed light from a central rear portion thereof. The hybrid lens 1000 is a modification of the hybrid optical device of FIG. 5 because the outer periphery is rectangular or square in shape rather than circular. This modification is particularly useful in situations where a plurality of the hybrid optical devices are combined together to form a larger hybrid optical device, noting that the flat side walls/edges of the lens makes it easy to arrange a plurality of the hybrid lenses 1000 together. The entire front side of the hybrid lens 1000 accepts incident light 1001 for viewing, while the compressed light 1002 exits from the center of the lens.

Figure 11:
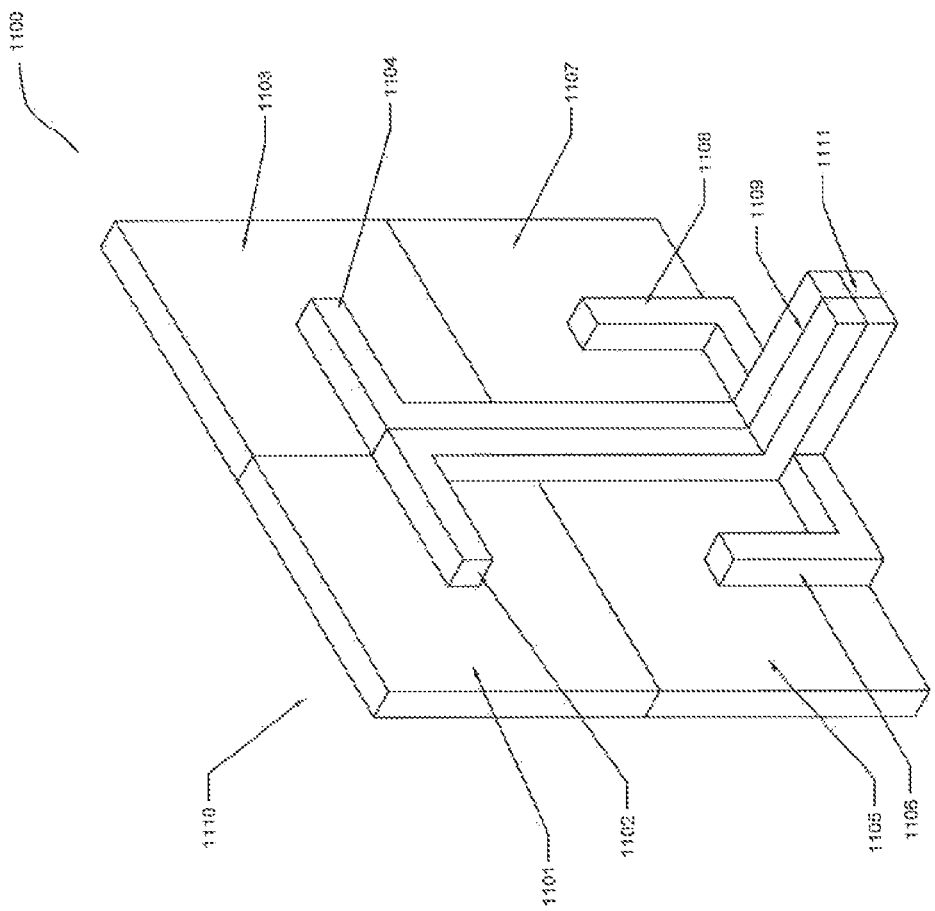
FIG. 11 is a rear perspective view of another application involving four of the hybrid optical devices such as shown in FIG. 10 (some details of which are omitted in FIG. 11) which are combined together in a single plane to form a larger hybrid optical device, and four light ducts are assembled to the rear surfaces of the hybrid optical devices, respectively, which receive the compressed light exiting the hybrid optical devices and redirect same to be output at the rear ends of the ducts.

FIG. 11 shows a rear perspective view of another application of the hybrid optical devices of the present invention in the form of an optical system 1100 which is a variation of the optical cloaking system 800 in FIG. 8 or the system 900 of FIG. 9. The system 1100 includes a plurality of hybrid optical devices 1101, 1103, 1105, 1107, such as the hybrid lens 1000 in FIG. 10, which have been combined together in a single plane to form a much larger hybrid optical device 1110, and a corresponding number of optical ducts 1102, 1104, 1106, 1108 which are assembled to the rear surfaces of the hybrid optical devices, respectively, receive the compressed light exiting the hybrid optical devices, and duct same to be output at the rear ends of the ducts in a very small/compact manner.

In FIG. 11 large front hybrid optical device 1100 is composed by the four single hybrid optical devices 1101, 1103, 1105, 1107 and four corresponding optical ducts 1102, 1104, 1106, 1108. The exit light ray of single hybrid optical device 1101 is arranged to pass through light duct 1102. The exit light ray of single hybrid optical device 1103 is arranged to pass through light duct 1104. The exit light ray of single hybrid optical device 1105 is arranged to pass through light duct 1106. The exit light ray of single hybrid optical device 1107 is arranged to pass through light duct 1108. All four light ducts 1102, 1104, 1106, 1108 have rear portions arranged closely together to effectively become a single continuous light duct 1109 at central bottom sections of the two lower hybrid optical devices 1105, 1107. By this system a very large number of incident light rays entering the front face 1110 of the combined hybrid optical device 1100 are compressed, bent, and ducted to exit as light rays 1111 from the light duct 1109. Although not shown in FIG. 11, the concentrated light exiting each of the hybrid optical devices 1101, 1103, 1105, 1107 exits through a central rear portion thereof and completely enters the an end portion of the corresponding optical duct 1102, 1104, 1106, 1108 disposed over the central rear portion, after which the concentrated light is directed through the optical ducts via mirrors, reflecting surfaces, and/or the like disposed within the ducts so as to be output as the light rays 1111 from the light duct 1109.

The optical system 1100 can be used to achieve many of the same advantages as achieved by the system 800 of FIG. 8 or the system 900 of FIG. 9. Like the application embodiment 900 in FIG. 9, the system 1100 is particularly useful in situations where it is impractical or undesirable to have a full size hybrid optical device on one side of an object which is being optically cloaked. Additionally, the system 1100 is very advantageous because it permits the overall size of the hybrid optical device to be greatly increased, so that it may thereby receive a greater amount of light rays therein, i.e., through face 1110, but without increasing the thickness of the hybrid optical device. In other words, by combining a plurality of the individual hybrid optical devices according to the present invention in an arrangement such as the system 1100 of FIG. 11, this further reduces the thickness or depth of the overall hybrid optical device in comparison to a system using a conventional optical device/lens such as the systems disclosed in prior application Ser. No. 13/714,770.

Figure 12:
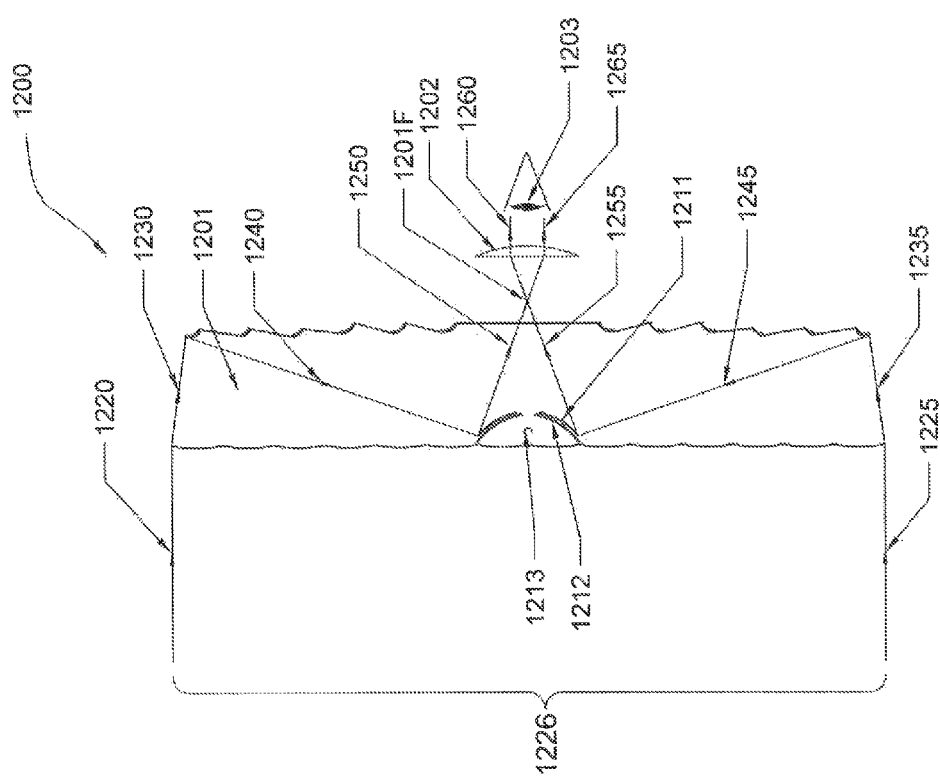
FIG. 12 is a side cross-sectional view of a hybrid optical device such as shown in FIG. 5 or FIGS. 7A-7C, but which outputs compressed light to a focal point, and which is combined together with a small convex lens as an eyepiece in an ultra-compact telescopic system.

FIG. 12 is a side cross-sectional view of a system in the form of a hybrid optical device 1200 such as the hybrid optical devices shown in FIG. 5 or FIG. 7A-7C, but which outputs compressed light to a focal point, and which is combined together with a small convex lens as an eyepiece in an ultra-compact telescopic system. As mentioned before, by changing exit collimating mirrors to hyperbolic mirrors in the hybrid optical devices of FIGS. 5 and 7A-7C, the exit light rays will be directed to converge to a focal point, rather than being directed to exit in a direction parallel to the direction of light rays entering the device. In the system the exit light rays from hybrid optical device 1200 are directed to converge to focal point 1201F using exit hyperbolic mirrors 1211, 1213. This gives the hybrid optical device 1200 a very short focal length for the compressed exit light rays even though it has a very large aperture for incoming light rays. The focal point 1201F is also the focal point of objective lens 1202. The incident light rays 1220 and 1225 converge to light rays 1230 and 1235, then are further compressed and reflected to light rays 1240 and 1245, and finally exit as light rays 1250 and 1255 with the focal point 1201F, which can be viewed by a person looking in the convex lens eyepiece 1202. Thus, the incident light rays with distance image is seen by an eye 1203 as in conventional telescopic systems, but with other advantages. Among other desirable advantages of such a telescopic system according to the present invention, it replaces the long, bulky, and heavy telescope tubes of conventional telescopes, with the compact and lightweight hybrid optical device 1200 according to the present invention. Hence a telescopic system using the hybrid optical device(s) of the present invention can be formed in an ultra-compact size in comparison to the conventional telescopic systems.

Figure 13:
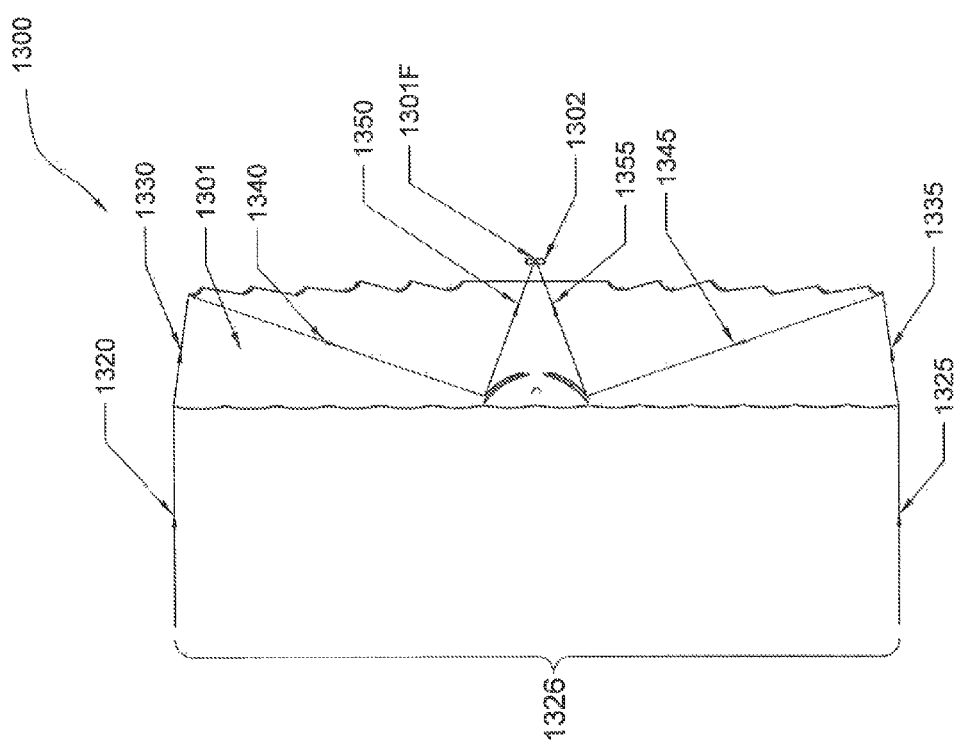
FIG. 13 is a side cross-sectional view of a hybrid optical device such as shown in FIG. 5 which outputs compressed light to a focal point, and is very useful for applications such as ultra-compact solar concentrators.

FIG. 13 is a side cross-sectional view of a system 1300 which is quite similar to the system 1200 of FIG. 12, but does not include a small convex lens as an eyepiece. Instead, in the system the compressed exit light rays are simply focused to a point 1301F at a small focal length from hybrid optical device 1300, where the compressed rays may be used for any number of advantageous purposes, such ultra-compact solar concentrators. The hybrid optical device 1300 corresponds to and has the same constructions as the hybrid optical device 1200 in the system of FIG. 12. In the system of FIG. 13 the hybrid optical device 1300 has a very short focal length with large aperture for incoming incident light rays. The incident light rays 1320 and 1325 converge to light rays 1330 and 1335, then are further compressed and reflected to light rays 1340 and 1345, after which they exit the device 1300 as light rays 1350 and 1355 on the focal point 1301F. A solar cell 1302 is positioned on the focal point 1301F to efficiently collect concentrated solar rays to generate electricity. A great advantage of this solar ray concentrator 1300 is that it is much flatter and thinner than conventionally known solar concentrators.

Figure 14:
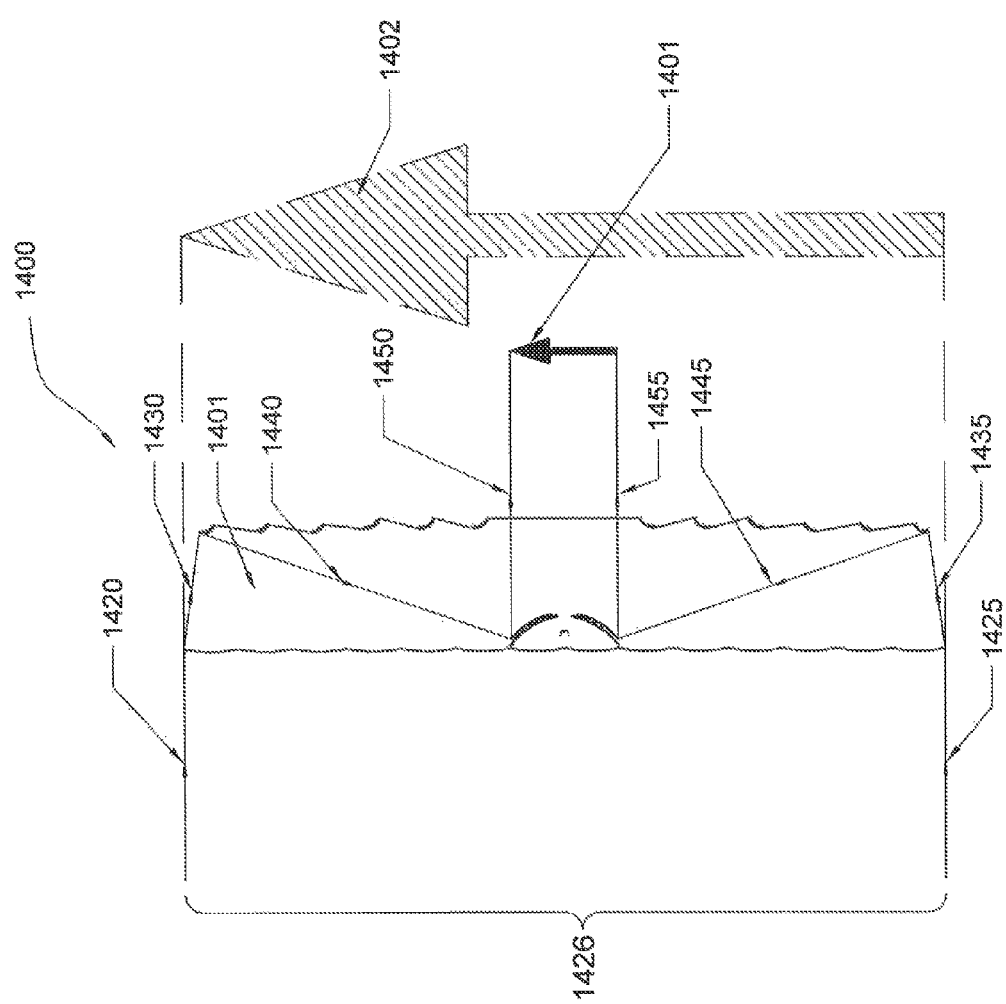
FIG. 14 is a side cross-sectional view of a hybrid optical device such as shown in FIG. 5 which outputs compressed light in a direction substantially parallel to a direction of the light which enters the aperture of the device, or in other words with a focal length of zero, and is very useful for applications such as ultra-compact magnifying lenses.

FIG. 14 is a side cross-sectional view of an application or system 1400 which involves a hybrid optical device such as shown in FIG. 5 or FIG. 7A-7C which outputs compressed light in a direction substantially parallel to a direction of the light which enters the aperture of the device, or in other words with a focal length of zero. In such application the hybrid optical device 1400 effectively functions as a ultra compact magnifying lens. When typical horizontal incident light rays 1420, 1425 enter the left side face of hybrid optical device 1400 in FIG. 14, the rays are converged to light rays 1430 and 1435, then are further converged and reflected to light rays 1440 and 1445, and then exit as light rays 1450 and 1455 in a direction substantially parallel to the rays 1420, 1425 entering the device 1400. When a person looks into front side of the hybrid lens, it sees an image 1402 which is a greatly magnified image of object 1401. Because the exit light rays 1450 and 1455 are parallel, the object 1401 can be in any distance away from the hybrid lens 1400, including zero distance when the device 1400 is placed with its (central) rear surface directly on the object 1401. This is very much different from conventional magnifying glasses which have a focal length so that an object image must be disposed within the focal length of the conventional magnifying glass. A great advantage of this magnifying glass 1400 according to the present invention is that it has very high magnifying rate without focal point limitation.

Although certain illustrative embodiments and applications have been described above, the present invention is not limited in its application to the details of construction and to the dispositions of the components set forth in the foregoing description or illustrated in the appended drawings in association with the present illustrative embodiments and applications of the invention. The present invention is capable of other embodiments and applications, and of being practiced and carried out in various ways. In addition, it is to be understood that the phraseology and terminology employed herein are for the purposes of illustration and example, and should not be regarded as limiting.

As such, those skilled in the art will appreciate that the concepts, upon which this disclosure is based, may readily be utilized as a basis for the designing of other structures, methods and systems for carrying out the several purposes of the present invention. It is important, therefore, that the claims be regarded as including such equivalent constructions.

For example, the illustrative embodiments of the hybrid optical devices according to the present invention generally compress and redirect light rays in three stages, i.e., a first stage in which a surface of the device is formed with plural sections which individually compress and redirect different portions of incident light rays shining the device, a second stage including a plurality of reflective surfaces which respectively receive the individually compressed and redirected portions of light from the first stage, and further compress and redirect same, and a third stage including reflective surfaces which receives the further compressed and redirected portions of light from the second stage, and redirect same for output from a given portion of the device either in a direction parallel to a direction of the original incident light rays or at a further concentrated focal point a very short distance from the device. However, the device need not include three stages, but could include one stage, two stages, or more than three stages. Also, the device could output the compressed light from more than one portion of the device, and could output the compressed light in direction(s) other than parallel to a direction of the original incident light rays or at a further concentrated focal point a very short distance from the device.

As another example, the illustrative embodiment of FIG. 11 combines a plurality of rectangular or square shaped hybrid optical devices in a single plane. However, the devices need not be rectangular or square shaped in order to be combined, but could have any given shape and still be combined. Also, the devices need not be combined in a single plane or combined only in a single plane, e.g., a plurality of the devices could be arranged along an axial line such that one of the devices further concentrates the light output by one or more others of the devices. In such arrangement, the optical device(s) downstream would further concentrate the concentrated light being output by the upstream device(s), unlike in the optical cloaking arrangement wherein an optical device downstream would re-enlarge the concentrated light being output by the upstream device.

As still another example, the devices need not have a structure corresponding to any of the illustrative embodiments, but could have other structures that achieve the same effect of concentrating incident light in an array or plurality of sections so as to reduce the depth and focal length of the device. For example, the portion of the device through which incoming light enters the device need not be formed continuous as in FIGS. 1, 2, and 4-10 or substantially continuous as in FIG. 11, but could be formed in a discontinuous manner in which sections are spaced from each other.

Further still, the above invention can be used in a wide variety of practical applications other than those specified in the present application.

What is claimed is:

1. A hybrid optical device for compressing light in a reversible manner, comprising: a unitary member made of a material with a single positive refractive index, the member including a first part which receives incident light shining on the device, wherein the first part is formed into sections along at least one direction thereof, wherein the sections receive respective portions of the incident light received by the first part, and individually compress and redirect the received portions of light in a non-overlapping arrangement corresponding to the incident light; the member including a second part which includes plural surfaces of the member which have reflective coating provided thereon and which respectively receive the portions of light which have been compressed and redirected by the sections of the first part, and further individually redirect the received portions of light in a non-overlapping arrangement corresponding to the incident light such that further redirected portions of light are decompressible and redirectable into light rays which are substantially the same as those of the incident light; the member including a third part which includes another surface having reflective coating provided thereon, wherein the coated surface of the third part individually receives the further compressed and redirected portions of light from the coated surfaces of the second part, and redirects same such that the light is output from the unitary member, and the first, second and third parts are interconnected by the unitary member.

2. The hybrid optical device according to claim 1, wherein the first part is formed into sections along two directions thereof, each of the sections compresses the portion of the light in both width and height directions, and the sections include curved areas defined in one face of the unitary member.

3. The hybrid optical device according to claim 1, wherein the unitary member made of the material with a single positive refractive index does not generate any internal reflection of the portions of light other than at the surfaces thereof having the reflective coating provided thereon which are included in the second and third parts.

4. The hybrid optical device according to claim 1, wherein one of the sections of the first part corresponds to a portion of the device from which the compressed and redirected light is output, and said one section of the first part is smaller in size than others of the sections of the first part.

5. The hybrid optical device according to claim 1, wherein the sections of the first part extend concentrically around a center of a face the unitary member.

6. A hybrid optical system for compressing light, including a plurality of the hybrid optical devices according to claim 1 arranged together in a single plane.

7. A hybrid optical system for optically cloaking an object, including a pair of the hybrid optical devices according to claim 1, wherein
  the unitary members of the pair of the hybrid optical devices are disposed symmetrically opposite to each other so as to jointly create an optical cloaking cavity therebetween in which the object may be disposed for being optically cloaked from a viewpoint of an observer positioned with either of the hybrid optical devices between the observer and the object,
  light output by one of the unitary members is directed into a portion of the other unitary member outside of the optical cloaking cavity, and
  the hybrid optical system is invisible to the observer positioned with either of the hybrid optical devices between the observer and the object such that the observer will see actual background behind the system up to peripheral edges of the system.

8. The hybrid optical device according to claim 1 wherein the third part collimates and outputs the further compressed portions of light in a direction substantially parallel to a direction of the incident light received by the first part.

9. The hybrid optical device according to claim 1 wherein the third part further compresses and outputs the further compressed portions of light received from the second part to a focal point positioned outside of the device.

10. A hybrid optical device for compressing light in a reversible manner, comprising: a first unitary member made of a material with a single positive refractive index, the first member receives incident light shining on the device, wherein the first unitary member is formed into sections along at least one direction thereof, wherein the sections receive respective portions of the incident light received by the first unitary member, and individually compress and redirect the received portions of light in a non-overlapping arrangement corresponding to the incident light; a second unitary member disposed in spaced relation to the first unitary member which includes plural surfaces having reflective coating provided thereon, and which respectively receive the portions of light which have been compressed and redirected by the first unity member sections, and further individually redirect the received portions of light in a non-overlapping arrangement corresponding to the incident light such that further redirected portions of light are decompressible and redirectable into light rays which are substantially the same as those of the incident light; and a third part including a mirror, wherein the third part individually receives the further redirected portions of light from the plural coated surfaces of the second unity member, and redirects same such that the light is output from the hybrid optical device, the third part is disposed between the first and second unitary members, and the first and second unitary members and the third part are configured to be disposed in a fixed relation to each other, and when so disposed will be contained within a viewpoint of an observer facing toward the first part of the unitary member which receives the incident light shining on the device.

11. The hybrid optical device according to claim 10 wherein the third part collimates and outputs the further compressed portions of light in a direction substantially parallel to a direction of the incident light received by the first part.

12. The hybrid optical device according to claim 10 wherein the third part further compresses and outputs the further compressed portions of light received from the second part to a focal point positioned outside of the device.

13. The hybrid optical device according to claim 10, wherein the unitary members are disposed in spaced relation to each other.

14. The hybrid optical device according to claim 10, wherein the mirror outputs the light from the hybrid optical device in a collimated, compressed or decompressed state, and the compressed and redirected portions of light from the sections of the first unitary member pass to the plural coated surfaces of second part through air or other gaseous medium.

15. A hybrid optical system for optically cloaking an object, including a pair of the hybrid optical devices according to claim 10, wherein
  the pair of the hybrid optical devices are disposed symmetrically opposite to each other so as to jointly create an optical cloaking cavity therebetween in which the object may be disposed for being optically cloaked from a viewpoint of an observer positioned with either of the hybrid optical devices between the observer and the object,
  light output by one of the hybrid optical devices is directed into a portion of the other unitary member outside of the optical cloaking cavity, and
  the hybrid optical system is invisible to the observer positioned with either of the hybrid optical devices between the observer and the object such that the observer will see actual background behind the system up to peripheral edges of the system.

16. The hybrid optical device according to claim 10, wherein the unitary member made of the material with a single positive refractive index does not generate any internal reflection of the portions of light other than at the surfaces thereof having the reflective coating provided thereon which are included in the second unitary member and the third parts.

17. A hybrid optical device for compressing light in a reversible manner, comprising: a unitary member including a first part which receives incident light shining on the device, wherein the first part is formed into sections along at least one direction thereof, wherein the sections respectively include concave reflective surfaces which receive respective portions of the incident light received by the first part, and individually compress and redirect the received portions of light in a non-overlapping arrangement corresponding to the incident light; the unitary member including a second part which includes plural surfaces of the member which have reflective coating provided thereon and which individually receive the portions of light which have been compressed and redirected by the sections of the first part, and further individually redirect the received portions of light in a non-overlapping arrangement corresponding to the incident light such that further redirected portions of light are decompressible and redirectable into light rays which are substantially the same as those of the incident light; and a third part including a mirror which individually receives the further redirected portions of light from the coated surfaces of the second part, and redirects same such that the light is output from the hybrid optical device, and wherein the unitary member and the third part are configured to be disposed in a fixed relation to each other, and when so disposed will be contained within a viewpoint of an observer facing toward the first part of the unitary member which receives the incident light shining on the device.

18. A hybrid optical system for optically cloaking an object, including a pair of the hybrid optical devices according to claim 17, wherein
the pair of the hybrid optical devices are disposed symmetrically opposite to each other so as to jointly create an optical cloaking cavity therebetween in which the object may be disposed for being optically cloaked from a viewpoint of an observer positioned with either of the hybrid optical devices between the observer and the object,
light output by one of the hybrid optical devices is directed into a portion of the other unitary member outside of the optical cloaking cavity, and
the hybrid optical system is invisible to the observer positioned with either of the hybrid optical devices between the observer and the object such that the observer will see actual background behind the system up to peripheral edges of the system.

19. The hybrid optical device according to claim 17 wherein the third part collimates and outputs the further compressed portions of light in a direction substantially parallel to a direction of the incident light received by the first part.

20. The hybrid optical device according to claim 17 wherein the third part further compresses and outputs the further compressed portions of light received from the second part to a focal point positioned outside of the device.

\* \* \* \* \*